(12) United States Patent
Kamihara

(10) Patent No.: US 7,418,538 B2
(45) Date of Patent: Aug. 26, 2008

(54) ELECTRONIC INSTRUMENT FOR CONCURRENTLY UPLOADING AND DOWNLOADING DATA

(75) Inventor: Yoshiyuki Kamihara, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 279 days.

(21) Appl. No.: 11/244,056

(22) Filed: Oct. 6, 2005

(65) Prior Publication Data

US 2006/0079976 A1 Apr. 13, 2006

(30) Foreign Application Priority Data

Oct. 12, 2004 (JP) .............................. 2004-297851

(51) Int. Cl.
*G06F 13/20* (2006.01)
*G06F 13/00* (2006.01)

(52) U.S. Cl. .................... 710/313; 710/300; 710/62; 710/72

(58) Field of Classification Search ......... 710/305–313, 710/300–304, 62–63, 72–74
See application file for complete search history.

(56) References Cited

U.S. PATENT DOCUMENTS

| | | | | |
|---|---|---|---|---|
| 5,729,708 A | * | 3/1998 | Satoh et al. .................... 710/52 |
| 6,029,213 A | * | 2/2000 | Belt et al. ...................... 710/72 |
| 6,058,441 A | | 5/2000 | Shu |
| 6,138,199 A | * | 10/2000 | Fleischer .................... 710/316 |
| 6,959,355 B2 | * | 10/2005 | Szabelski .................... 710/313 |
| 7,028,133 B1 | * | 4/2006 | Jackson ....................... 710/313 |
| 7,152,190 B2 | * | 12/2006 | Overtoom .................... 714/44 |
| 7,185,126 B2 | * | 2/2007 | Szabelski .................... 710/60 |
| 2002/0193015 A1 | * | 12/2002 | Milan ..................... 439/752.5 |
| 2004/0168009 A1 | * | 8/2004 | Szabelski .................... 710/313 |
| 2004/0243755 A1 | * | 12/2004 | Lee et al. .................... 710/311 |
| 2005/0086413 A1 | * | 4/2005 | Lee et al. .................... 710/313 |
| 2005/0172062 A1 | * | 8/2005 | Adams ....................... 710/305 |
| 2006/0020737 A1 | * | 1/2006 | Szabelski .................... 710/313 |
| 2006/0059293 A1 | * | 3/2006 | Wurzburg et al. ........... 710/313 |
| 2006/0136621 A1 | * | 6/2006 | Tung et al. .................... 710/62 |
| 2006/0242352 A1 | * | 10/2006 | Torudbakken et al. ....... 710/312 |
| 2006/0277334 A1 | * | 12/2006 | Sim et al. .................... 710/62 |

FOREIGN PATENT DOCUMENTS

| | | |
|---|---|---|
| JP | A-9-102335 | 4/1997 |
| JP | A 2000-163168 | 6/2000 |
| JP | A-2002-23965 | 1/2002 |
| JP | A 2002-116853 | 4/2002 |
| JP | A-2002-343864 | 11/2002 |

* cited by examiner

*Primary Examiner*—Christopher B. Shin
(74) *Attorney, Agent, or Firm*—Oliff & Berridge, PLC

(57) ABSTRACT

An electronic instrument including: an upstream port UPPT provided on a side surface SF1 of the electronic instrument; a downstream port DWPT provided on a side surface SF2 which is a surface of the electronic instrument and opposite to the side surface SF1; and a data transfer control device which is connected to the upstream port UPPT and the downstream port DWPT and controls data transfer through the upstream port UPPT and data transfer through the downstream port DWPT.

27 Claims, 20 Drawing Sheets

| IN | OUTDIS | OP | ON |
|---|---|---|---|
| L | L | H | H |
| H | L | L | L |
| — | H | H | L |

ELECTRONIC INSTRUMENT FOR CONCURRENTLY UPLOADING AND DOWNLOADING DATA

Japanese Patent Application No. 2004-297851, filed on Oct. 12, 2004, is hereby incorporated by reference in its entirety.

BACKGROUND OF THE INVENTION

The present invention relates to an electronic instrument.

In recent years, a portable music player with a built-in hard disk has become popular. In the portable music player, music data compressed according to MP3, ATRAC, or the like is downloaded from a personal computer (PC) and stored in the hard disk of the portable music player. The user enjoys music by reproducing the stored music data.

However, the hard disk (storage) in which the music data is stored cannot be easily removed from the portable music player. Therefore, it is difficult to exchange the music data between friends, whereby convenience to the user is reduced.

In recent years, a high-speed serial interface such as USB 2.0 has attracted attention. As the technology of realizing such a high-speed serial interface, various related-art technologies have been proposed (e.g. Japanese Patent Application Laid-Open No. 2002-343864).

In the USB standard, a downstream port of a host, such as a PC, is connected with an upstream port of a device (peripheral), such as a portable electronic instrument, through a USB cable, so that data is transferred between the host and the device. Therefore, a device-side electronic instrument is generally provided with only the upstream port. If the electronic instrument is provided with only the upstream port, data cannot be transferred by causing the electronic instrument as the device to operate as the host.

SUMMARY

According to a first aspect of the invention, there is provided an electronic instrument, comprising:

an upstream port provided on a first side surface of the electronic instrument;

a downstream port provided on a second side surface which is a surface of the electronic instrument and opposite to the first side surface; and a data transfer control device which is connected to the upstream port and the downstream port and controls data transfer through the upstream port and data transfer through the downstream port.

According to a second aspect of the invention, there is provided an electronic instrument, comprising:

an upstream port provided on a first side surface of the electronic instrument;

a downstream port provided on a second side surface of the electronic instrument differing from the first side surface; and a data transfer control device which is connected to the upstream port and the downstream port and controls data transfer through the upstream port and data transfer through the downstream port, wherein a connector having a first shape is provided to the upstream port; and wherein a connector having a second shape which is capable of being coupled with the connector having the first shape is provided to the downstream port.

DETAILED DESCRIPTION OF THE EMBODIMENTS

Figure 1A:
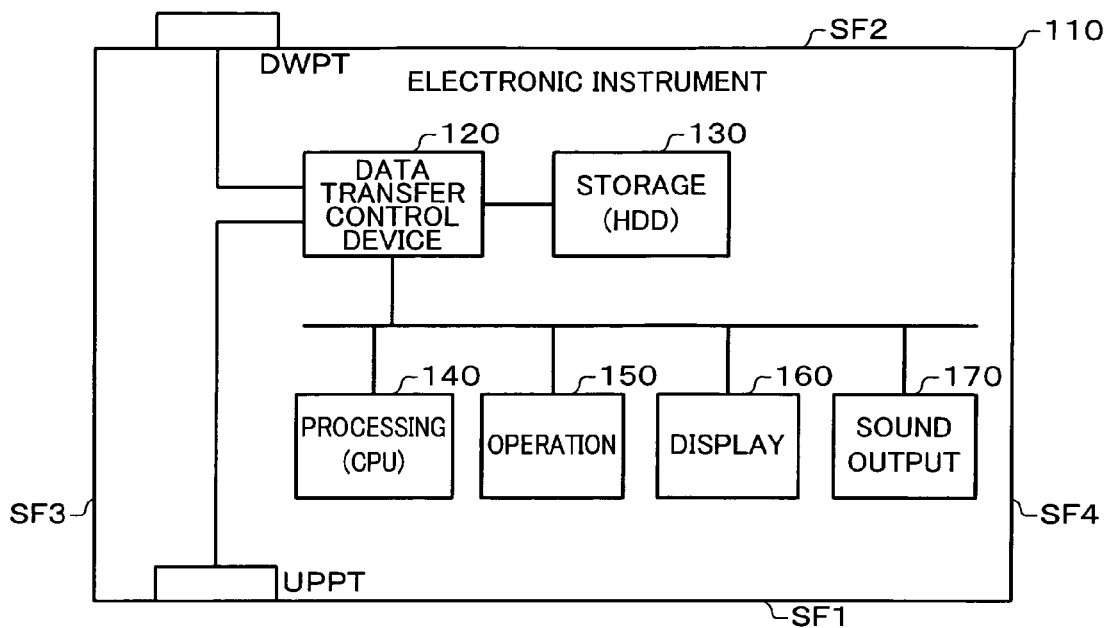
FIGS. 1A and 1B show a configuration example of an electronic instrument according to one embodiment.

The invention may provide an electronic instrument which facilitates data transfer between instruments.

According to one embodiment of the invention, there is provided an electronic instrument, comprising:

an upstream port provided on a first side surface of the electronic instrument;

a downstream port provided on a second side surface which is a surface of the electronic instrument and opposite to the first side surface; and a data transfer control device which is connected to the upstream port and the downstream port and controls data transfer through the upstream port and data transfer through the downstream port.

In this embodiment, data can be transferred between the electronic instrument and the second electronic instrument by connecting the downstream port provided on the second side surface of the electronic instrument with the upstream port provided on the first side surface of the second electronic instrument. Or, data can be transferred between the electronic instrument and the second electronic instrument by connecting the upstream port provided on the first side surface of the electronic instrument with the downstream port provided on the second side surface of the second electronic instrument. This facilitates data transfer between the instruments, whereby convenience can be improved.

In this electronic instrument, a position of the downstream port on the second side surface may correspond to a position of the upstream port on the first side surface.

The position of the downstream port of the electronic instrument thus corresponds to the position of the upstream port of the second electronic instrument, or the position of the upstream port of the electronic instrument corresponds to the position of the downstream port of the second electronic instrument. This further facilitates data transfer between the instruments.

In this electronic instrument, the downstream port and the upstream port may be provided in line symmetry with respect to a center line between a line extending in a longitudinal direction along the first side surface and a line extending in the longitudinal direction along the second side surface.

This enables port connection between the electronic instrument and the second electronic instrument by contacting the second side surface of the electronic instrument with the first side surface of the second electronic instrument or contacting the first side surface of the electronic instrument with the second side surface of the second electronic instrument, whereby convenience can be further improved.

In this electronic instrument, a connector having a first shape may be provided to the upstream port; and a connector having a second shape which is capable of being coupled with the connector having the first shape may be provided to the downstream port.

According to one embodiment of the invention, there is provided an electronic instrument, comprising:

an upstream port provided on a first side surface of the electronic instrument;

a downstream port provided on a second side surface of the electronic instrument differing from the first side surface; and a data transfer control device which is connected to the upstream port and the downstream port and controls data transfer through the upstream port and data transfer through the downstream port, wherein a connector having a first shape is provided to the upstream port; and wherein a connector having a second shape which is capable of being coupled with the connector having the first shape is provided to the downstream port.

In this embodiment, data can be transferred between the electronic instrument and the second electronic instrument by connecting the downstream port provided on the second side surface of the electronic instrument with the upstream port provided on the first side surface of the second electronic instrument, for example. Or, data can be transferred between the electronic instrument and the second electronic instrument by connecting the upstream port provided on the first side surface of the electronic instrument with the downstream port provided on the second side surface of the second electronic instrument. This facilitates data transfer between the instruments.

Moreover, the connector provided to the upstream port can be directly connected to the connector provided to the downstream port, whereby convenience to the user can be improved.

In any of the above electronic instruments, one of the connectors having the first and second shapes may be a female connector, and the other of the connectors having the first and second shapes may be a male connector.

In any of the above electronic instruments, the data transfer control device may include:

a device controller which controls data transfer as a device; and a host controller which controls data transfer as a host, wherein, when a second electronic instrument has been connected to the downstream port, the host controller controls data transfer between the electronic instrument and the second electronic instrument through the downstream port; and wherein, when the second electronic instrument has been connected to the upstream port, the device controller controls data transfer between the electronic instrument and the second electronic instrument through the upstream port.

In any of the above electronic instruments, when a second electronic instrument has been connected to the downstream port, the data transfer control device may perform processing of copying or moving data stored in a storage of the electronic instrument to a storage of the second electronic instrument through the downstream port, or processing of copying or moving data stored in a storage of the second electronic instrument to the storage of the electronic instrument through the downstream port.

Any of the above electronic instruments may comprise an operation section which allows a user to issue an operation instruction, wherein the data transfer control device performs the copy or movement processing based on the operation instruction from the operation section.

In any of the above electronic instruments, when a second electronic instrument has been connected to the downstream port, the data transfer control device may perform processing of transmitting data stored in a storage of the electronic instrument to a storage of the second electronic instrument through the downstream port, or processing of receiving data stored in the storage of the second electronic instrument from the second electronic instrument through the downstream port under control of a data transfer control device of the second electronic instrument.

In any of the above electronic instruments, when a second electronic instrument has been connected to the upstream port, the data transfer control device may perform processing of copying or moving data stored in a storage of the electronic instrument to a storage of the second electronic instrument through the upstream port, or processing of copying or moving data stored in a storage of the second electronic instrument to the storage of the electronic instrument through the upstream port.

Any of the above electronic instruments may comprise an operation section which allows a user to issue an operation instruction, wherein the data transfer control device performs the copy or movement processing based on the operation instruction from the operation section.

In any of the above electronic instruments, when a second electronic instrument has been connected to the upstream port, the data transfer control device may perform processing of transmitting data stored in a storage of the electronic instrument to a storage of the second electronic instrument through the upstream port, or processing of receiving data stored in the storage of the second electronic instrument from the second electronic instrument through the upstream port under control of a data transfer control device of the second electronic instrument.

In any of the above electronic instruments, the data transfer control device may include:

a transceiver connected to the upstream port and the downstream port;

a device controller which controls data transfer as a device;

a host controller which controls data transfer as a host; and a first selector which performs switch control for connecting the transceiver to the device controller during upstream connection and connecting the transceiver to the host controller during downstream connection.

This enables the transceiver to be used in common during the downstream connection and the upstream connection, whereby the scale of the instrument can be reduced.

In any of the above electronic instruments, the data transfer control device may include:

a data buffer which temporarily stores transfer data; and a second selector which performs switch control for connecting the data buffer to the device controller during upstream connection and connecting the data buffer to the host controller during downstream connection.

This enables the data buffer to be used in common during the downstream connection and the upstream connection, whereby the scale of the instrument can be reduced.

In any of the above electronic instruments, a transceiver included in the data transfer control device may include:

upstream differential signal lines connected to an upstream port;

downstream differential signal lines connected to a downstream port;

common differential signal lines used in common by the upstream port and the downstream port;

a first transmission driver for a first transfer mode, an output of the first transmission driver being connected to the upstream differential signal lines;

a second transmission driver for the first transfer mode, an output of the second transmission driver being connected to the downstream differential signal lines;

a first switch circuit which connects an input of the first transmission driver to an output of a logic circuit which outputs transmission data during upstream connection, and connects an input of the second transmission driver to the output of the logic circuit during downstream connection;

a second switch circuit which connects the upstream differential signal lines to the common differential signal lines during the upstream connection, and connects the downstream differential signal lines to the common differential signal lines during the downstream connection; and a third transmission driver for a second transfer mode which is lower in speed than the first transfer mode, an output of the third transmission driver being connected to the common differential signal lines.

According to this feature, while the first and second transmission drivers for the high-speed first transfer mode are separately provided, the third transmission driver for the low-speed second transfer mode is used in common during the downstream connection and the upstream connection. This enables the scale of the instrument to be reduced while maintaining the quality of the signal characteristics.

In any of the above electronic instruments, a transceiver included in the data transfer control device may include:

upstream differential signal lines connected to an upstream port;

downstream differential signal lines connected to a downstream port;

common differential signal lines used in common by the upstream port and the downstream port;

a first transmission driver for a first transfer mode, an output of the first transmission driver being connected to the upstream differential signal lines;

a second transmission driver for the first transfer mode, an output of the second transmission driver being connected to the downstream differential signal lines;

a first switch circuit which connects an input of the first transmission driver to an output of a logic circuit which outputs transmission data during upstream connection, and connects an input of the second transmission driver to the output of the logic circuit during downstream connection;

a second switch circuit which connects the upstream differential signal lines to the common differential signal lines during the upstream connection, and connects the downstream differential signal lines to the common differential signal lines during the downstream connection;

a differential receiver for the first transfer mode, an input of the differential receiver being connected to the common differential signal lines; and a detection circuit which detects whether differential signal data is valid or invalid, an input of the detection circuit being connected to the common differential signal lines.

According to this feature, while the first and second transmission drivers for the high-speed first transfer mode are separately provided, the differential receiver for the first transfer mode and the detection circuit are used in common during the downstream connection and the upstream connection. This enables the scale of the instrument to be reduced while maintaining the transmission/reception performance.

These embodiments of the invention will be described in detail below. Note that the embodiments described below do not in any way limit the scope of the invention laid out in the claims herein. In addition, not all of the elements of the embodiments described below should be taken as essential requirements of the invention.

1. Configuration of Electronic Instrument

Figure 1B:
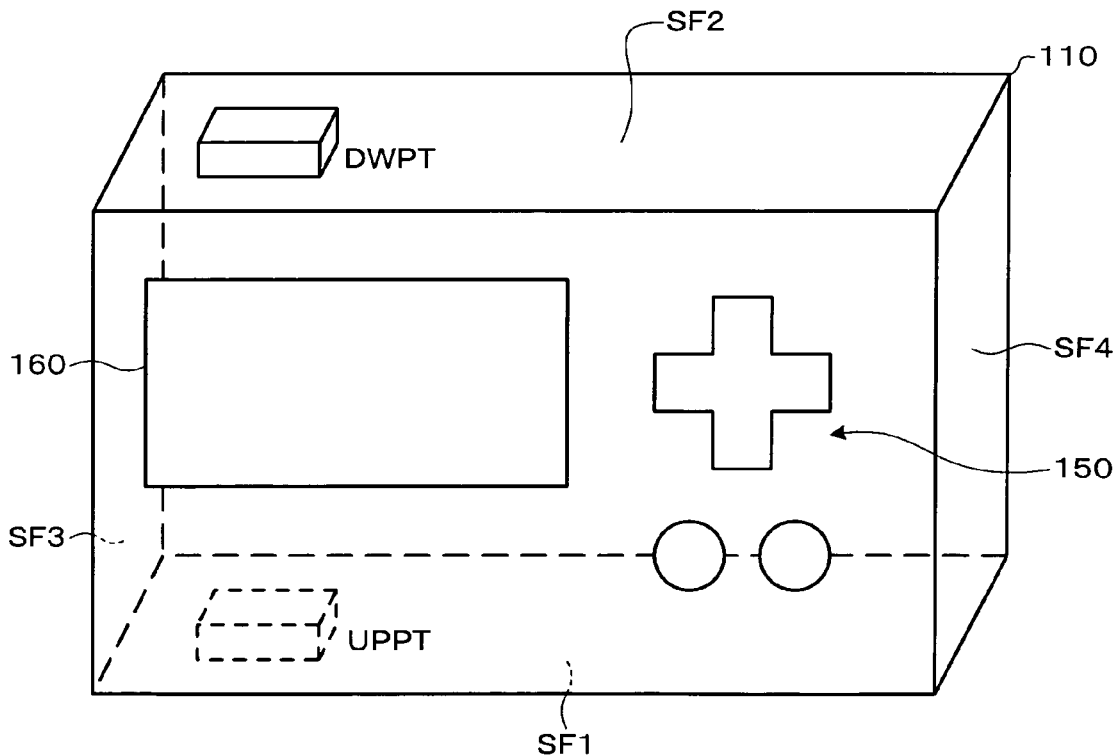

FIGS. 1A and 1B show a configuration example of an electronic instrument according to one embodiment of the invention. An electronic instrument 110 includes a data transfer control device 120, a storage 130, a processing section 140, an operation section 150, a display section 160, and a sound output section 170. The electronic instrument 110 includes an upstream port UPPT and a downstream port DWPT. The electronic instrument 110 may be configured to exclude some of these sections. For example, the electronic instrument 110 may be configured to exclude at least one of the storage 130, the processing section 140, the operation section 150, the display section 160, and the sound output section 170.

In FIGS. 1A and 1B, the upstream port UPPT is provided on a side surface SF1 (first side surface or first side) of the electronic instrument 110. The downstream port DWPT is provided on a side surface SF2 (second side surface or second side) of the electronic instrument 110. The side surface SF2 is a surface (opposite surface) opposite to the side surface DF1.

In more detail, as shown in FIGS. 1A and 1B, the downstream port DWPT is provided at a position (position on the side surface SF2) corresponding to the position (position on the side surface SF1) at which the upstream port UPPT is provided. In more detail, the upstream port UPPT and the downstream port DWPT are provided at positions line-symmetrical with respect to the center line between a line extending in the longitudinal direction along the side surface SF1 (center line of the side surface SF1) and a line extending in the longitudinal direction along the side surface SF2 (center line of the side surface SF2).

The upstream port UPPT and the downstream port DWPT may be provided at positions differing from the line-symmetrical positions. The electronic instrument 110 may have a shape other than a rectangular parallelepiped. For example, the electronic instrument 110 may be polygonal other than quadrilateral in the top view of FIG. 1A. At least a part of the side surface may be curved.

The upstream port UPPT and the downstream port DWPT may be provided on surfaces (e.g. side surfaces SF3 and SF4) other than the side surfaces SF1 and SF2. For example, the upstream port UPPT may be provided on the side surface SF2, and the downstream port DWPT may be provided on the side surface SF1. The upstream port UPPT may be provided on the side surface SF3 and the downstream port DWPT may be provided on the side surface SF4, or the upstream port UPPT may be provided on the side surface SF4 and the downstream port DWPT may be provided on the side surface SF3. The upstream port UPPT may be provided on the side surface SF1 or SF2 and the downstream port DWPT may be provided on the side surface SF3 or SF4, or the downstream port DWPT may be provided on the side surface SF1 or SF2 and the upstream port UPPT may be provided on the side surface SF3 or SF4. The side surfaces SF1 to SF4 may be referred to as surfaces (surfaces having a small area) which make up the electronic instrument 110 excluding the top surface (surface on which the operation section 150, the display section 160, and the like are provided; surface having the largest area) and the bottom surface (back surface).

The data transfer control device 120 is connected with the upstream port UPPT and the downstream port DWPT, and controls data transfer through the upstream port UPPT (data transfer in the upstream direction) and data transfer through the downstream port DWPT (data transfer in the downstream direction). In more detail, the data transfer control device 120 operates as the device during data transfer through the upstream port UPPT, and operates as the host during data transfer through the downstream port DWPT. As the data transfer control device 120, a data transfer control device configured as shown in FIGS. 7 to 10 as described later or the like may be employed.

The storage 130 stores sound data (music data or voice data) and image data (still image data and video data). As the storage 130, a hard disk (HDD), a large-capacity memory (RAM), an optical disk, or the like may be used.

The processing section 140 controls the entire electronic instrument 110 and the like. The function of the processing section 140 is realized by hardware such as a CPU and a program such as firmware.

The operation section 150 allows the user to operate the electronic instrument 110. As the operation section 150, a cross key, a button, a joy stick, or the like may be used. The display section 160 displays various images (still image and video image) to the user. As the display section 160, a liquid crystal display (LCD), an organic EL display, or the like may be used. The sound output section 190 outputs sound such as music and voice. As the sound output section 190, a speaker, a sound output terminal (headphone), or the like may be used.

When the electronic instrument 110 is a portable music player, music data is downloaded from an external electronic instrument (e.g. PC) through the upstream port UPPT or the downstream port DWPT, and is stored in the storage 130. The stored music data is read from the storage 130, reproduced, and output to the user by the sound output section 170. When the electronic instrument 110 is a portable image player, image data is downloaded from an external electronic instrument through the upstream port UPPT or the downstream port DWPT, and is stored in the storage 130. The stored image data is read from the storage 130 and displayed to the user using the display section 160.

2. Connection Using Connector

As shown in FIG. 1B, a connector having a first shape is provided to the upstream port UPPT. In more detail, a female connector (receptacle) is provided. A connector having a second shape connectable (engageable) with the connector having the first shape is provided to the downstream port DWPT. In more detail, a male connector (plug) connectable with the female connector (receptacle) is provided. A male connector may be provided to the upstream port UPPT, and a female connector may be provided to the downstream port DWPT.

Figure 2:
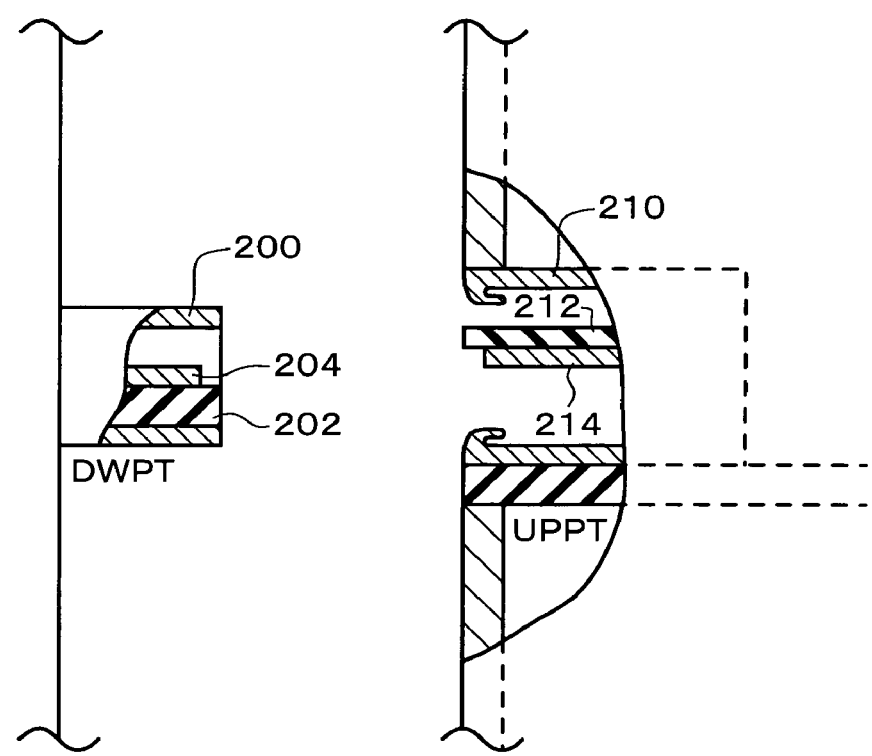
FIG. 2 shows examples of a connector shape.

FIG. 2 shows examples of the shapes of the connectors provided to the downstream port DWPT and the upstream port UPPT. The shapes of these connectors may be almost or completely the same as the shapes of the USB plug and receptacle.

The male connector (plug) provided to the downstream port DWPT includes a frame member 200 made of a metal, a plate member 200 made of a resin which is attached to the inner wall of the frame member 200, and wiring 204 (a plurality of wires) provided on the top surface of the plate member 200. The female connector (receptacle) provided to the upstream port UPPT includes a frame member 210 made of a metal, a plate member 212 made of a resin which is provided inside a hole in the frame member 210, and wiring 214 (a plurality of wires) provided on the bottom surface of the plate member 212.

The hole in the connector (plate member 212) provided to the upstream port UPPT is formed to have such a shape and size that the connector (frame member 200) provided to the downstream port DWPT can be inserted into the hole. When the connector provided to the downstream port DWPT is inserted into the hole in the connector provided to the upstream port UPPT, the wiring 204 on the side of the downstream port DWPT and the wiring 214 on the side of the upstream port UPPT come into contact by the elastic force of the plate member 212, so that the wiring 204 and the wiring 214 are electrically connected. This enables signal transfer between the downstream port DWPT and the upstream port UPPT through the wiring 204 and the wiring 214.

The shapes of the connectors provided to the downstream port DWPT and the upstream port UPPT are not limited to the shapes shown in FIG. 2. Various modifications and variations may be made. For example, a connector having a shape almost or completely differing from the shape of the USB plug or receptacle may be used. Or, a male connector in which only the wiring protrudes and a female connector in which a hole into which the wiring can be inserted is formed may be used.

The male connector may be formed so that the connector can be stored in the electronic instrument 110, for example. Specifically, the male connector (or cable with connector) may be stored in a storage area in the electronic instrument 110 when data is not transferred, and the male connector (or cable with connector) may protrude from the storage area in the electronic instrument 110 when data is transferred.

There may be a case where a charging device for the electronic instrument 110 includes the downstream port, and charging or data transfer with a PC can be performed by connecting the upstream port UPPT of the electronic instrument 110 with the downstream port of the charging device. In this case, a connector having a shape almost or completely the same as the shape of the downstream port connector provided to the charging device may be provided to the downstream port DWPT of the electronic instrument 110. This enables the upstream port UPPT of the electronic instrument 110 to be utilized not only as a port for connecting with the downstream port of the charging device, but also as a port for connecting with a downstream port of another electronic instrument.

Figure 3:
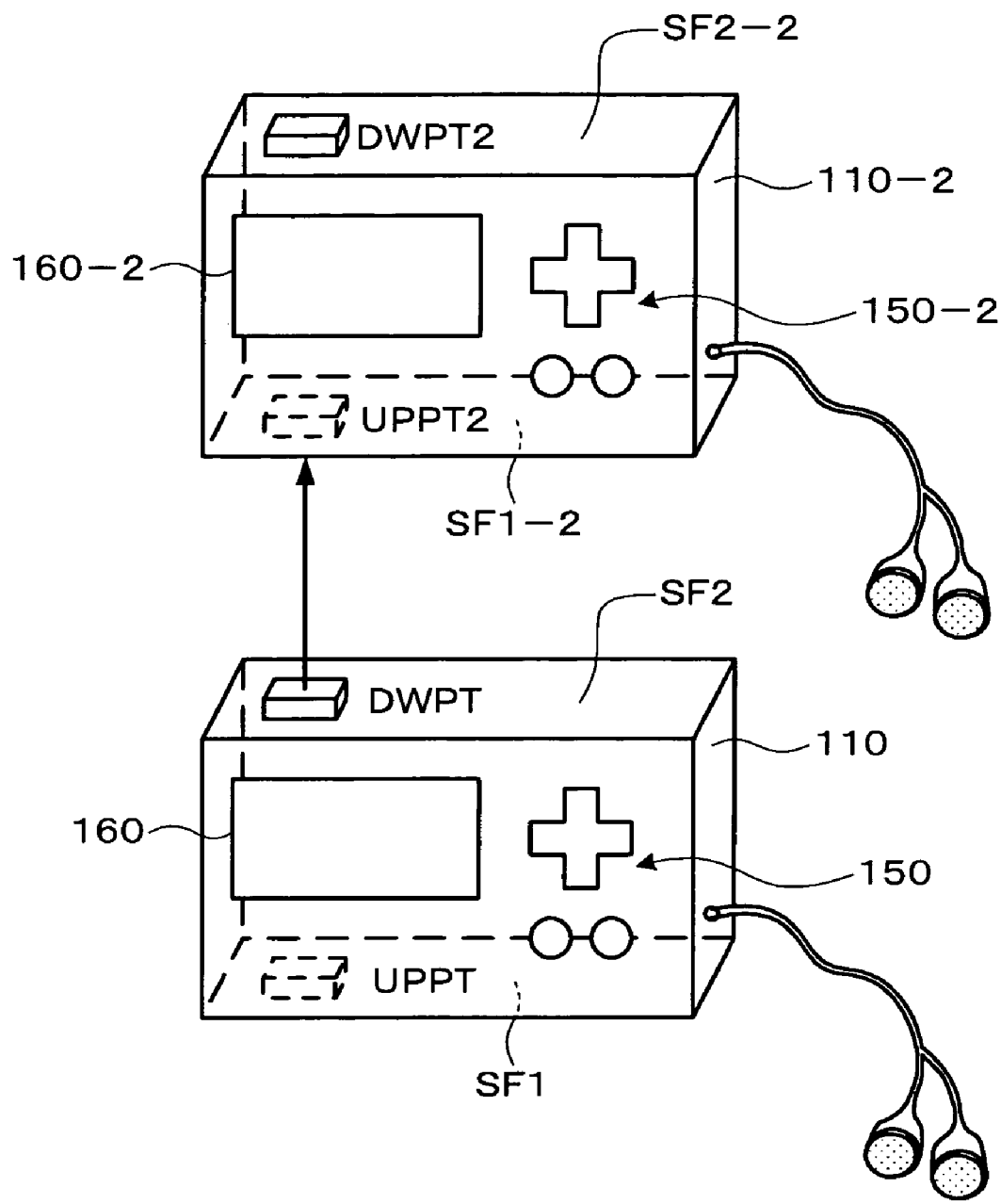
FIG. 3 is illustrative of an electronic instrument connection method.

The downstream port DWPT of the electronic instrument 110 and an upstream port UPPT of a second electronic instrument (e.g. instrument of the same type as the electronic instrument 110) can be connected (directly connected) as shown in FIG. 3 by providing suitable connectors to the downstream port DWPT and the upstream port UPPT as shown in FIGS. 1A, 1B, and 2. As a result, data (sound data and image data) stored in the storage 130 of the electronic instrument 110 can be copied or moved to a storage of a second electronic instrument 110-2.

In the case of a portable CD player or MD player, a CD or MD in which music data is stored can be removed and provided to a friend or the like. In the case of a portable music player having a built-in hard disk or the like, the hard disk (storage) in which music data is stored cannot be easily removed from the instrument. Therefore, it is difficult to exchange music data, which is compressed according to MP3 or ATRAC and stored in the hard disk, between friends. Specifically, in order to exchange music data, music data stored in the hard disk of the portable music player is read into a personal computer (PC). The read music data is written into a CD-R on the PC and the CD-R is delivered to a friend, or the music data is transferred to a friend's PC through the Internet.

In the embodiment, the electronic instrument include both the upstream port UPPT and the downstream port DWPT. As shown in FIG. 3, the downstream port DWPT is provided on the second side surface SF2 of the electronic instrument 110, and the upstream port UPPT2 is provided on a first side surface SF1-2 of the partner-side second electronic instrument 110-2. Therefore, the user can easily connect the downstream port DWPT of the user's electronic instrument 110 with the upstream port UPPT2 of the friend's electronic instrument 110-2 by contacting the side surface SF2 of the user's electronic instrument 110 with the side surface SF1-2 of the friend's electronic instrument 110-2. This enables the music data in the electronic instrument 110 to be transferred to the second electronic instrument 110-2.

When connecting the downstream port DWPT of the electronic instrument 110 with the upstream port UPPT2 of the electronic instrument 110-2 as shown in FIG. 3, a host controller 80 shown in FIG. 8 as described later included in the data transfer control device 120 of the electronic instrument 110 controls data transfer through the downstream port DWPT. Specifically, selectors 90 and 92 shown in FIG. 8 select the downstream port DWPT. Switches SW1, SW2, and SW3 of switch circuits 60 and 62 shown in FIG. 11 as described later are switched to the DWPT side. In the HS mode, an HS transmission driver 43 transmits data by driving differential signal lines DPDW and DMDW. When the partner-side electronic instrument 110-2 transmits data in the HS mode, an HS differential receiver 52 receives the data through the differential signal lines DPDW and DMDW, the switch circuit 62, and common differential signal lines DPCM and DMCM.

In FIG. 3, the upstream port UPPT2 of the electronic instrument 110-2 is connected with the downstream port DWPT of the electronic instrument 110 so that data is transferred by causing the electronic instrument 110 to operate as the host. However, the downstream port DWPT2 of the electronic instrument 110-2 may be connected with the upstream port UPPT of the electronic instrument 110 so that data is transferred by causing the electronic instrument 110 to operate as the device. In this case, a device controller 70 shown in FIG. 2 as described later included in the data transfer control device 120 of the electronic instrument 110 controls data transfer through the upstream port UPPT. Specifically, the selectors 90 and 92 shown in FIG. 8 select the UPPT side. The switches SW1, SW2, and SW3 of the switch circuits 60 and 62 shown in FIG. 11 as described later are switched to the side of the upstream port UPPT. In the HS mode, an HS transmission driver 42 transmits data by driving the differential signal lines DPUP and DMUP. When the partner-side electronic instrument 110-2 transmits data in the HS mode, the HS differential receiver 52 receives the data through the differential signal lines DPUP and DMUP, the switch circuit 62, and the common differential signal lines DPCM and DMCM.

3. Copy and Movement Processing

Figure 4:
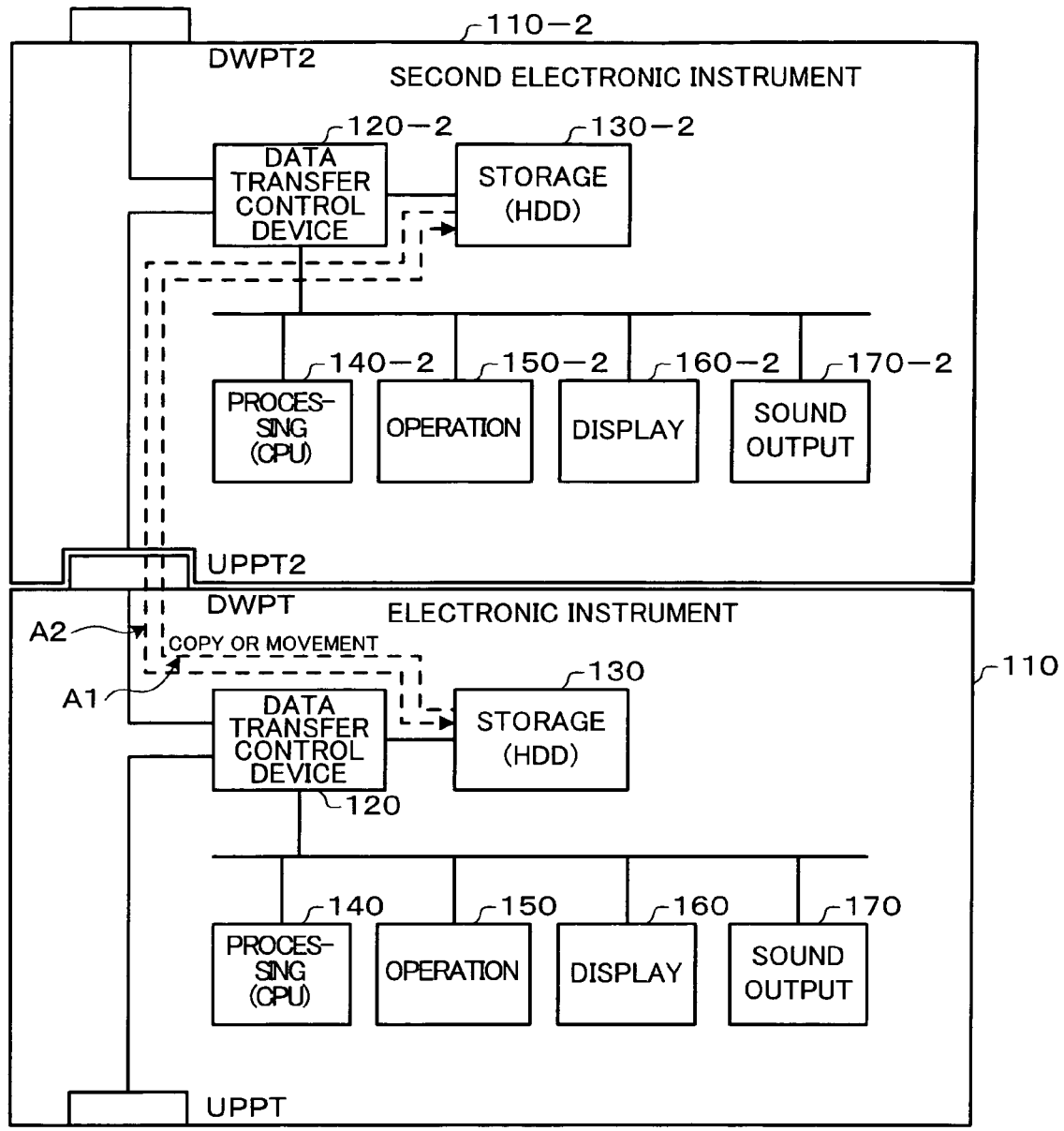
FIG. 4 is illustrative of copy or movement processing.

In FIG. 4, the upstream port UPPT2 of the electronic instrument 110-2 is connected with the downstream port DWPT of the electronic instrument 110.

In this case, data copy and movement processing can be performed under control of the data transfer control device 120 of the electronic instrument 110, for example. As indicated by A1 shown in FIG. 4, the data transfer control device 120 performs processing of copying or moving data stored in the storage 130 of the electronic instrument 110 to a storage 130-2 of the second electronic instrument 110-2 through the downstream port DWPT. Specifically, data (sound data or image data) is read from the storage 130 and transmitted to the second electronic instrument 110-2 through the downstream port DWPT. Or, as indicated by A2 shown in FIG. 4, the data transfer control device 120 performs processing of copying or moving data stored in the storage 130-2 of the second electronic instrument 110-2 to the storage 130 of the electronic instrument 110 through the downstream port DWPT. Specifically, data received from the second electronic instrument 110-2 through the downstream port DWPT is written into the storage 130.

When performing the data copy or movement processing shown in FIG. 4 under control of the data transfer control device 120 of the electronic instrument 110, the copy or movement processing may be performed based on operation instructions from the operation section 150 of the electronic instrument 110. In more detail, the user selects the copy or movement target tune from tunes displayed in the display section 160 by operating the operation section 150 of the electronic instrument 110. As a result, music data of the selected tune is automatically copied or moved from the electronic instrument 110 to the electronic instrument 110-2, or automatically copied or moved from the electronic instrument 110-2 to the electronic instrument 110.

In FIG. 4, the data copy or movement processing may be performed under control of the data transfer control device 120-2 of the partner-side electronic instrument 110-2. Specifically, the data transfer control device 120 transmits data stored in the storage 130 of the electronic instrument 110 to the second electronic instrument 110-2 through the downstream port DWPT, as indicated by A1 shown in FIG. 4, under control of the data transfer control device 120-2 of the electronic instrument 110-2. Or, the data transfer control device 120 receives data stored in the storage 130-2 of the second electronic instrument 110-2 through the downstream port DWPT, as indicated by A2 shown in FIG. 4.

Figure 5:
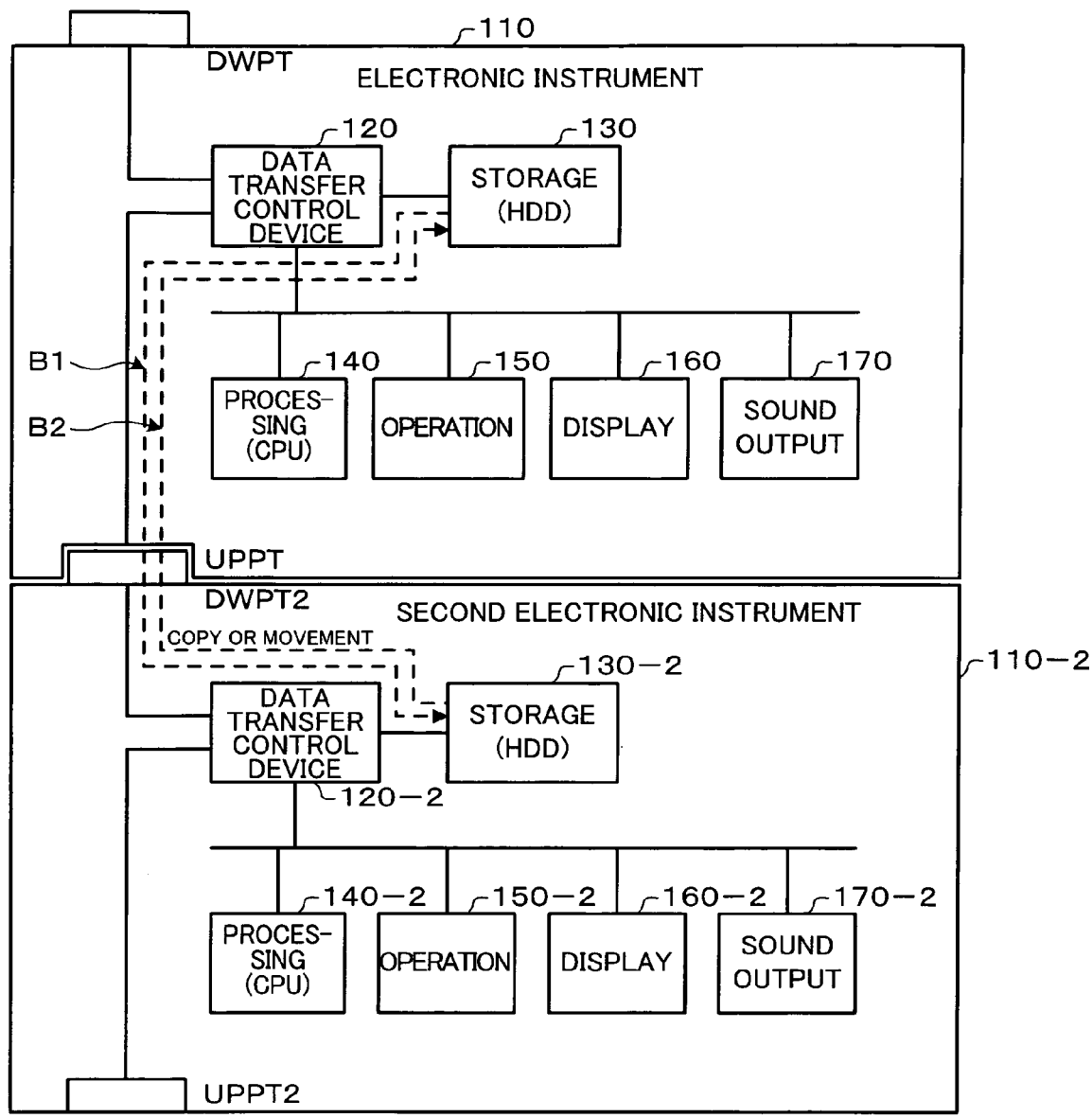
FIG. 5 is illustrative of copy or movement processing.

In FIG. 5, the downstream port DWPT2 of the electronic instrument 110-2 is connected with the upstream port UPPT of the electronic instrument 110.

In this case, the data copy or movement processing can be performed under control of the data transfer control device 120 of the electronic instrument 110, for example. As indicated by B1 shown in FIG. 5, the data transfer control device 120 performs processing of copying or moving data stored in the storage 130 of the electronic instrument 110 to the storage 130-2 of the second electronic instrument 110-2 through the upstream port UPPT. Specifically, data is read from the storage 130 and transmitted to the second electronic instrument 110-2 through the upstream port UPPT. Or, as indicated by B2 shown in FIG. 5, the data transfer control device 120 performs processing of copying or moving data stored in the storage 130-2 of the second electronic instrument 110-2 to the storage 130 of the electronic instrument 110 through the upstream port UPPT. Specifically, data received from the second electronic instrument 110-2 through the upstream port UPPT is written into the storage 130.

When performing the data copy or movement processing shown in FIG. 5 under control of the data transfer control device 120 of the electronic instrument 110, the copy or movement processing may be performed based on operation instructions from the operation section 150 of the electronic instrument 110, for example.

In FIG. 5, the data copy or movement processing may be performed under control of the data transfer control device 120-2 of the partner-side electronic instrument 110-2. Specifically, the data transfer control device 120 transmits data stored in the storage 130 of the electronic instrument 110 to the second electronic instrument 110-2 through the upstream port UPPT, as indicated by B1 shown in FIG. 5, under control of the data transfer control device 120-2 of the electronic instrument 110-2. Or, the data transfer control device 120 receives data stored in the storage 130-2 of the second electronic instrument 110-2 from the second electronic instrument 110-2 through the upstream port UPPT, as indicated by B2 shown in FIG. 5.

4. Detailed Processing Example

Figure 6:
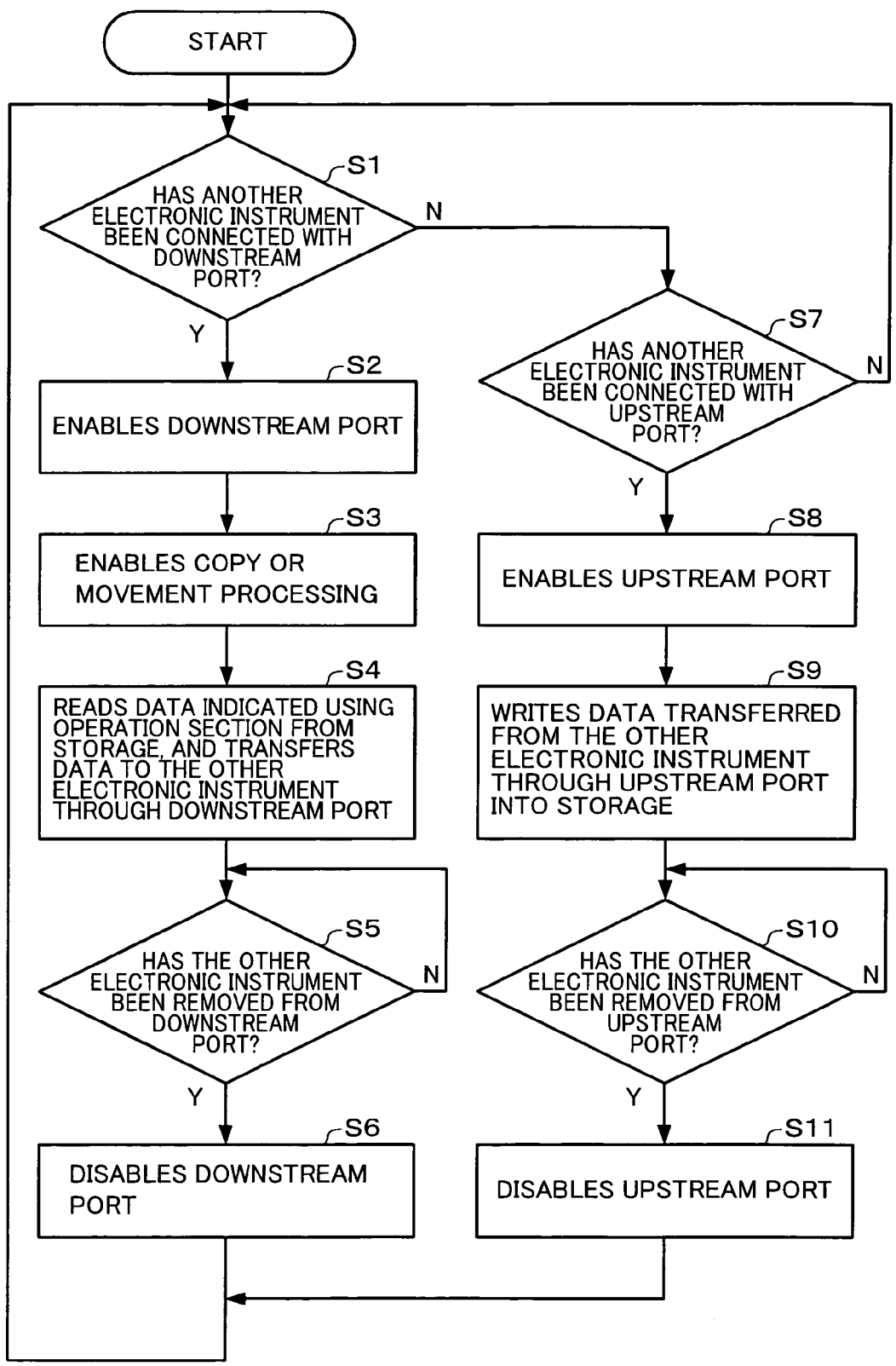
FIG. 6 is a detailed processing example according to one embodiment of the invention.

A detailed processing example in the embodiment is described below using a flowchart shown in FIG. 6. First, whether or not another electronic instrument has been connected with the downstream port is detected (step S1). When another electronic instrument has been connected, the downstream port is enabled (step S2), and data copy or movement processing is enabled (step S3).

Then, data (tune) indicated using the operation section is read from the storage, and transferred to the other electronic instrument through the downstream port (step S4).

Whether or not the other electronic instrument has been removed from the downstream port is detected (step S5). When another electronic instrument has been removed, the downstream port is disabled (step S6).

When connection of another electronic instrument with the downstream port has not been detected in the step S1, whether or not another electronic instrument has been connected with the upstream port is detected (step S7). When the connection is detected, the upstream port is enabled (step S8).

Then, data transferred from the other electronic instrument through the upstream port is written into the storage (step S9).

Whether or not the other electronic instrument has been removed from the upstream port is detected (step S10). When another electronic instrument has been removed, the upstream port is disabled (step S11).

5. Configuration of Data Transfer Control Device

A USB data transfer control device incorporated into a device is generally provided with only an upstream port. If the data transfer control device is provided with only the upstream port, data cannot be transferred by causing the portable electronic instrument to operate as the host.

In this case, if the device-side data transfer control device is provided with not only the upstream port but also a downstream port, the data transfer control device can transfer data as the host.

Figure 7:
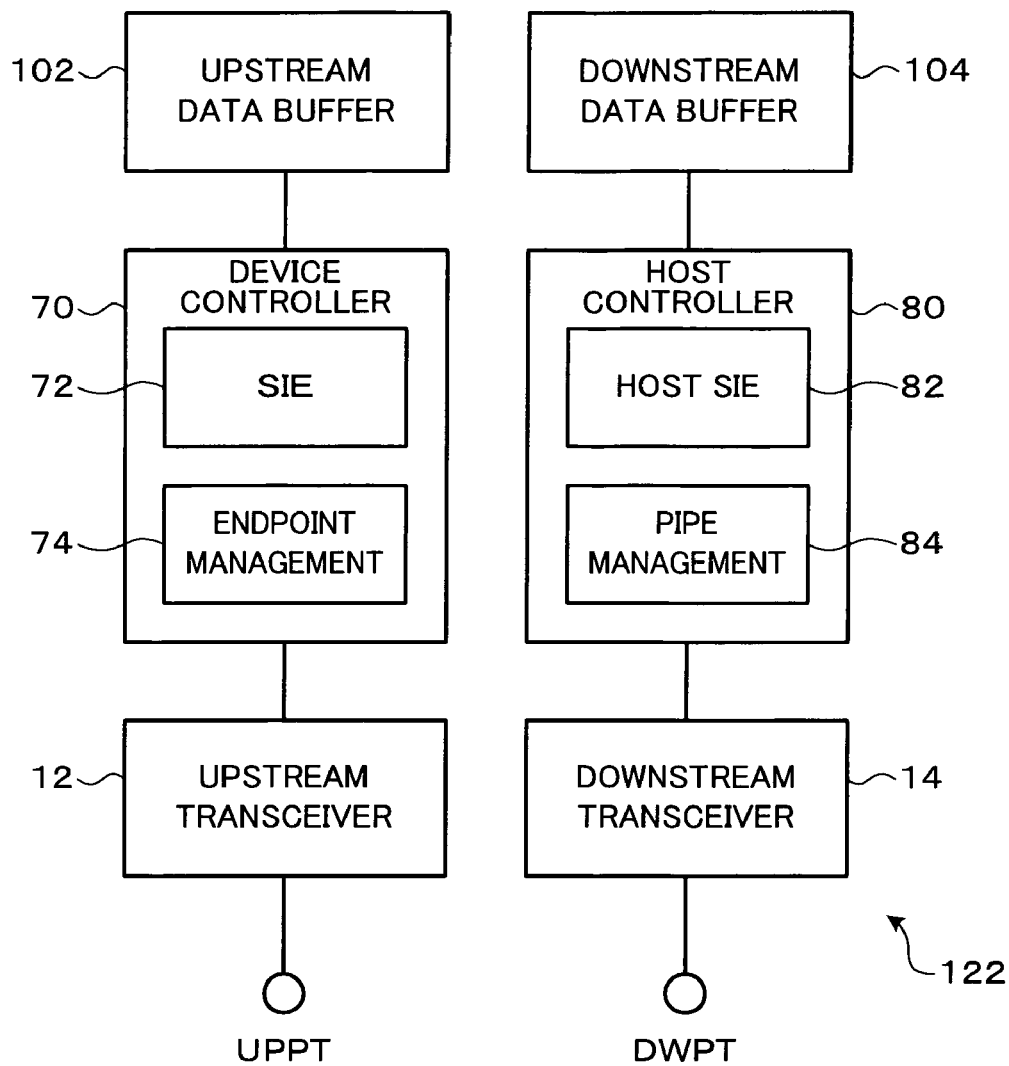
FIG. 7 is a configuration example of a data transfer control device.

However, if the data transfer control device is provided with both the upstream port and the downstream port, as shown in a configuration example in FIG. 7, it is necessary to provide not only an upstream transceiver 12 and data buffer 102, but also a downstream transceiver 14 and data buffer 104. This poses a problem such as an increase in circuit scale or an increase in product cost.

Figure 8:
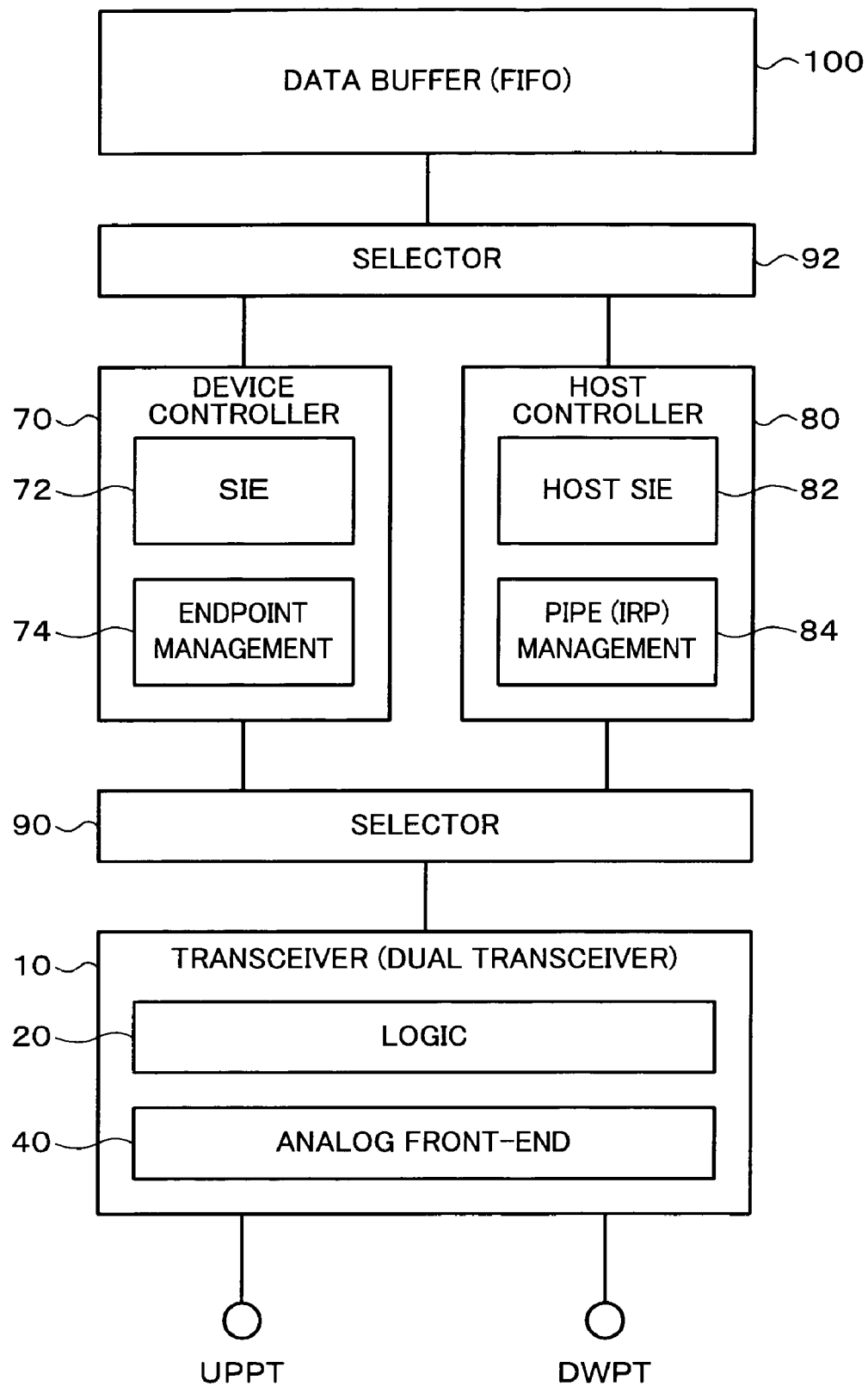
FIG. 8 is a configuration example of a data transfer control device.

FIG. 8 shows a configuration example of a data transfer control device which can solve the above-described problems. The data transfer control device includes a transceiver 10, a device controller 70, a host controller 80, selectors 90 and 92, and a data buffer (FIFO) 100. The data transfer control device may be configured to exclude some of these sections.

The transceiver 10 (dual transceiver) is a circuit for transmitting and receiving data through the USB (serial bus in a broad sense) using differential signal lines (DP and DM), and includes a logic circuit 20 which is a part of a USB logical layer circuit, and an analog front-end circuit 40 which is a physical layer circuit (PHY). Taking USB 2.0 as an example, a circuit conforming to the USB 2.0 Transceiver Macrocell Interface (UTMI) specification may be used as the transceiver 10.

The logic circuit 20 included in the transceiver 10 performs End of Packet (EOP) generation/deletion, SYNC (SYNChronization) generation/deletion, NRZI encoding, NRZI decoding, bit-stuffing (bit insertion), bit-unstuffing (bit deletion), serial/parallel conversion, parallel/serial conversion, differential signal line state (e.g. J, K, SE0) generation/detection, and the like.

The analog front-end circuit 40 (transmission/reception circuit) included in the transceiver 10 includes a transmission driver, a receiver, a detection circuit, and the like for performing transmission/reception in a full speed (FS) mode and a high speed (HS) mode. Specifically, the analog front-end circuit 40 includes analog circuits for performing data transmission by driving (current-driving) the differential signal lines, data reception using the differential signal lines, detection of validity of differential signal data, detection of connection of the differential signal lines, pull-up control of the differential signal lines, and the like.

In the USB standard, data is transmitted and received by differential signals using the DP (Data+) and DM (Data−) signal lines. The USB 2.0 standard defines the HS mode (first transfer mode in a broad sense) and the FS mode (second transfer mode in a broad sense) as transfer modes. The HS mode is a transfer mode additionally defined in the USB 2.0 standard. The FS mode is a transfer mode which has been defined in the USB 1.1 standard. The transceiver 10 can transmit and receive data in either transfer mode.

In the embodiment, the data transfer control device includes an upstream port UPPT (first port in a broad sense) and a downstream port DWPT (second port in a broad sense). The transceiver 10 has a dual transceiver configuration which allows data transmission/reception through the upstream port UPPT and data transmission/reception through the downstream port DWPT.

The device controller 70 and the host controller 80 are transfer controllers for controlling data transfer through the USB (serial bus). In more detail, the device controller 70 and the host controller 80 control data transfer as a transaction layer, a link layer, and the like. The device controller 70 (peripheral controller) controls data transfer as the device (peripheral), and the host controller 80 controls data transfer as the host. For example, when a second electronic instrument (host) is connected with the upstream port UPPT, the device controller 70 controls data transfer to and from the second electronic instrument through the upstream port UPPT. When the second electronic instrument (device) is connected with the downstream port DWPT, the host controller 80 controls data transfer to and from the second electronic instrument through the downstream port DWPT.

A serial interface engine (SIE) 72 included in the device controller 70 and a host SIE 82 included in the host controller 80 perform packet handling processing, transaction management processing, suspend/resume control processing, and the like.

An endpoint management circuit 74 included in the device controller 70 performs endpoint management processing. In more detail, the endpoint management circuit 74 allocates an endpoint region in the data buffer 100, manages or identifies an endpoint number, and performs endpoint region FIFO control and the like. A pipe management circuit 84 included in the host controller 80 performs pipe (I/O request packet (IRP)) management processing. In more detail, the pipe management circuit 84 allocates a pipe region in the data buffer 100, manages or identifies a pipe number, and performs endpoint region FIFO control and the like. The pipe region is a region allocated in the data buffer 100 corresponding to one endpoint of the device.

The selector 90 (first selector) performs switch control for connecting the transceiver 10 with the device controller 70 during upstream connection (during data transfer through the upstream port) and connecting the transceiver 10 with the host controller 80 during downstream connection (during data transfer through the downstream port). The selector 92 (second selector) performs switch control for connecting the data buffer 100 with the device controller 70 during the upstream connection and connecting the data buffer 100 with the host controller 80 during the downstream connection.

The data buffer 100 (FIFO or packet buffer) is used to temporarily store (buffer) data (transmission data, reception data, or packet) transferred through the USB (serial bus). The data buffer 100 may be realized by a memory such as a random access memory (RAM).

According to the configuration shown in FIG. 8, when a partner-side electronic instrument (second electronic instrument) is connected with the upstream port UPPT, the selector 90 connects the transceiver 10 with the device controller 70, and the selector 92 connects the device controller 70 with the data buffer 100. The device controller 70 controls data transfer in the upstream direction through the upstream port UPPT. Specifically, the device controller 70 controls data transfer as the USB device (peripheral). In this case, the endpoint regions are allocated in the data buffer 100, and received data or transmission target data is temporarily stored in each endpoint region. The device controller 70 controls data transfer between each endpoint region allocated in the data buffer 100 and the partner-side electronic instrument (host) connected with the upstream port UPPT.

When the partner-side electronic instrument is connected with the downstream port DWPT, the selector 90 connects the transceiver 10 with the host controller 80, and the selector 92 connects the host controller 80 with the data buffer 100. The host controller 80 controls data transfer in the downstream direction through the downstream port DWPT. Specifically, the host controller 80 controls data transfer as the USB host. In this case, the pipe (IRP) regions are allocated in the data buffer 100, and received data or transmission target data is temporarily stored in each pipe region. The host controller 80 controls data transfer between each pipe region allocated in the data buffer 100 and the partner-side electronic instrument (device) connected with the downstream port DWPT.

In the embodiment, the transceiver 10 has a dual transceiver configuration having functions of an upstream transceiver and a downstream transceiver as described later. Specifically, when the partner-side electronic instrument is connected with the upstream port UPPT and the selector 90 connects the transceiver 10 with the device controller 70, the transceiver 10 functions as the upstream transceiver by performing switch control of an internal switch circuit. This enables data transmission/reception in the upstream direction. When the partner-side electronic instrument is connected with the downstream port DWPT and the selector 90 connects the transceiver 10 with the host controller 80, the transceiver 10 functions as the downstream transceiver by performing switch control of the internal switch circuit. This enables data transmission/reception in the downstream direction.

In the configuration example shown in FIG. 7, the selectors 90 and 92 are not provided, differing from the configuration example shown in FIG. 8. Moreover, the upstream transceiver 12 and the downstream transceiver 14 are separately provided instead of the dual transceiver configuration. Furthermore, the upstream data buffer 102 and the downstream data buffer 104 are provided instead of using the data buffer in common for the device controller 70 and the host controller 80. In other words, a downstream data transfer control device and an upstream data transfer control device are separately provided in the configuration example shown in FIG. 7.

In the configuration example shown in FIG. 7, since the upstream transceiver 12 and the downstream transceiver 14 and the upstream data buffer 102 and the downstream data buffer 104 are separately provided, the circuit scale is increased. Specifically, since these circuits have overlapping circuit sections, an unnecessary circuit section exists.

In the configuration example shown in FIG. 8, since the transceiver 10 and the data buffer 100 are used in common by the device controller 70 and the host controller 80, the number of unnecessary circuit sections can be reduced, whereby the circuit scale and product cost can be reduced.

The data transfer control device is not limited to the configuration shown in FIGS. 7 and 8. Various modifications and variations may be made. For example, the transceiver 10 may be used in common by the device controller 70 and the host controller 80, and the upstream data buffer 102 and the downstream data buffer 104 may be separately provided, as shown in a modification shown in FIG. 9. Specifically, the selector 92 shown in FIG. 8 is not provided in FIG. 9.

Figure 9:
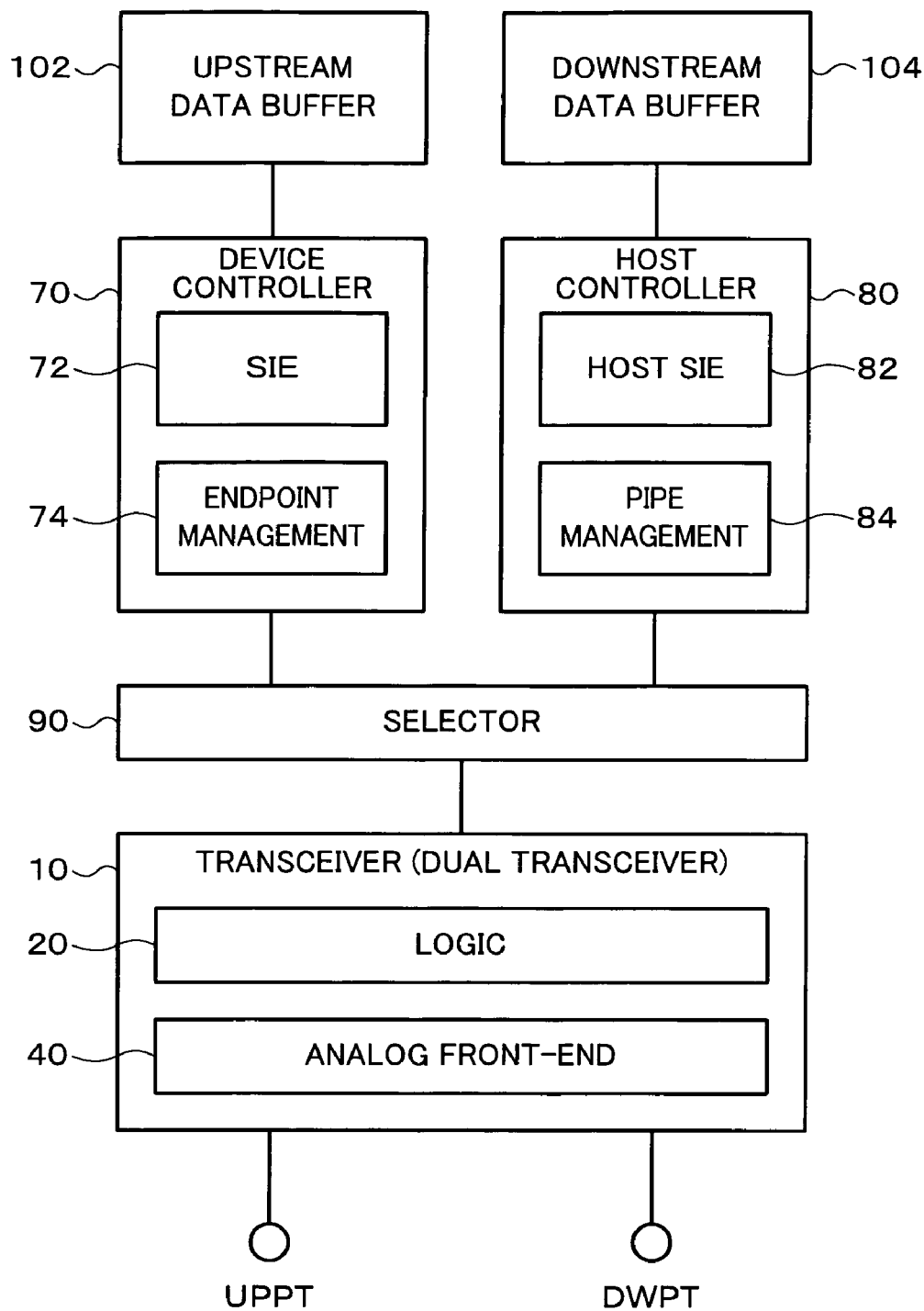
FIG. 9 is a modification of a data transfer control device.

In the configuration shown in FIG. 9, the endpoint management circuit 74 allocates the endpoint regions in the upstream data buffer 102 during the upstream connection. The device controller 70 controls data transfer between each endpoint region allocated in the upstream data buffer 102 and the partner-side electronic instrument (host) connected with the upstream port UPPT. The pipe management circuit 84 allocates the pipe regions in the downstream data buffer 104 during the downstream connection. The host controller 80 controls data transfer between each pipe region allocated in the downstream data buffer 104 and the partner-side electronic instrument (device) connected with the downstream port DWPT.

In FIG. 8, other circuit blocks may be provided between the transceiver 10 and the selector 90, between the selector 90 and the device controller 70 and the host controller 80, between the device controller 70 and the host controller 80 and the selector 92, or between the selector 92 and the data buffer 100.

Figure 10:
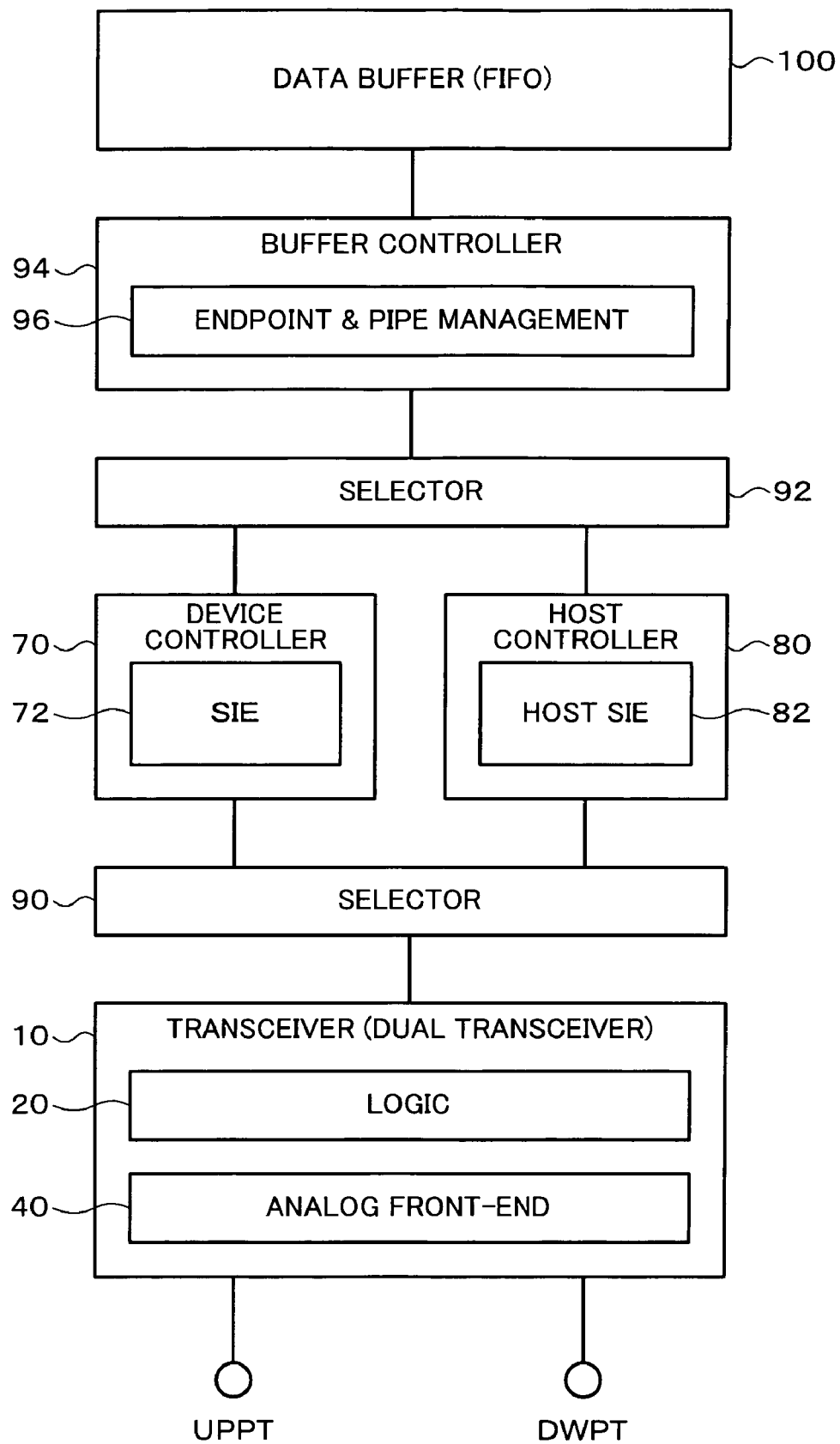
FIG. 10 is a modification of a data transfer control device.

In a modification shown in FIG. 10, a buffer controller 94 is provided between the selector 92 and the data buffer 100. An endpoint & pipe management circuit 96 is provided in the buffer controller 94. The endpoint & pipe management circuit 96 allocates the endpoint regions in the data buffer 100 during the upstream connection, and the device controller 70 controls data transfer using the allocated endpoint regions. The endpoint & pipe management circuit 96 allocates the pipe regions in the data buffer 100 during the downstream connection, and the host controller 80 controls data transfer using the allocated pipe regions. According to the configuration as shown in FIG. 10, since the overlapping circuit sections of the endpoint management circuit 74 and the pipe management circuit 84 shown in FIG. 8 can be eliminated, the circuit scale can be further reduced.

6. Configuration of Transceiver

Figure 11:
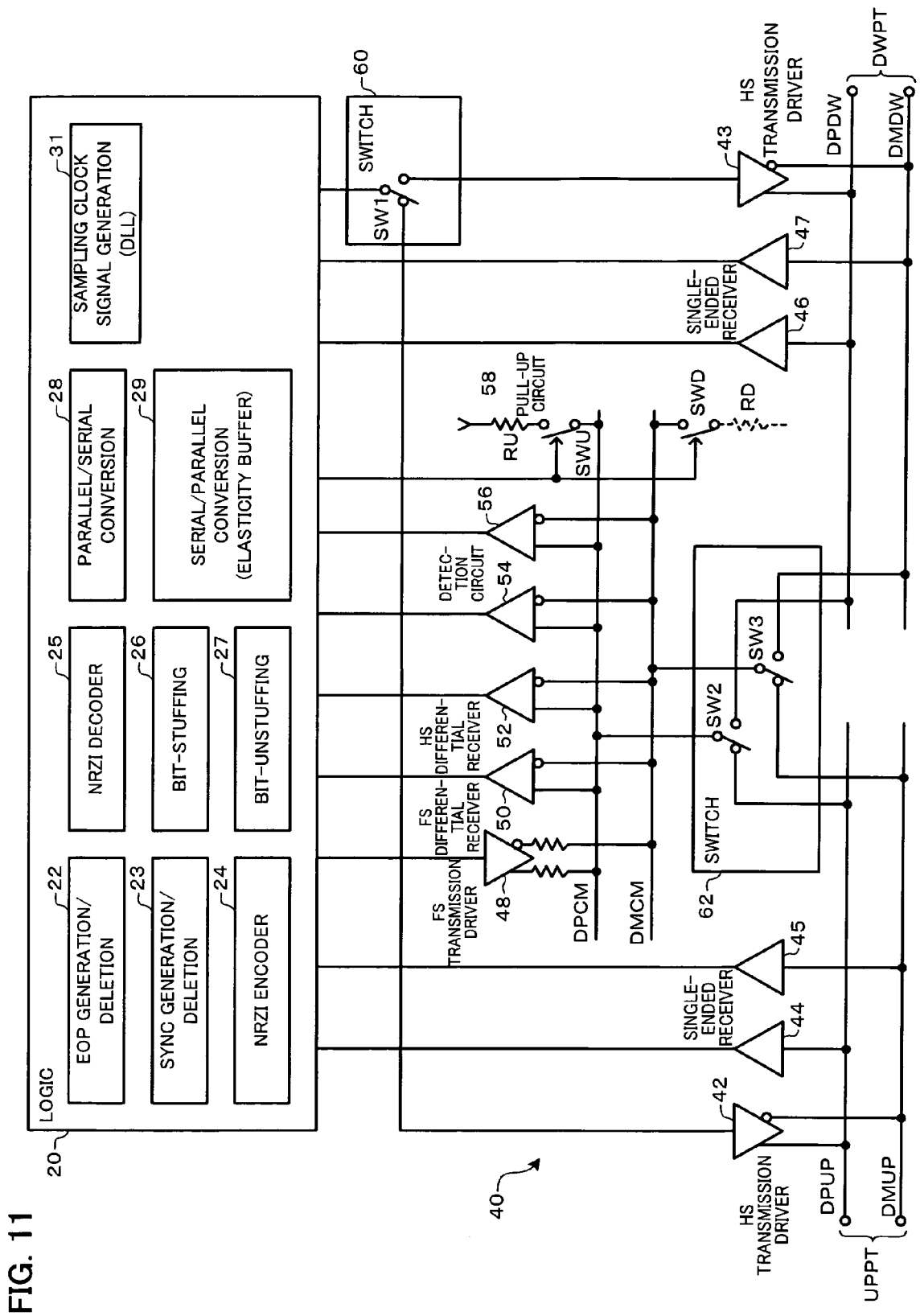
FIG. 11 is a configuration example of a transceiver.

FIG. 11 shows a configuration example of the transceiver 10 (dual transceiver) according to the embodiment. The transceiver according to the embodiment does not necessarily include all the constituent elements shown in FIG. 11, and may be configured to exclude some of the constituent elements.

The transceiver 10 includes the logic circuit 20 and the analog front-end circuit 40. The logic circuit 20 includes an EOP generation-deletion circuit 22, a SYNC generation-deletion circuit 23, an NRZI encoder 24, an NRZI decoder 25, a bit-stuffing circuit 26, a bit-unstuffing circuit 27, a parallel/serial conversion circuit 28, a serial/parallel conversion circuit 29, and a sampling clock generation circuit (DLL) 31. The data transfer control device may be configured to exclude some of these sections.

The EOP generation-deletion circuit 22 performs processing of generating and adding an end of packet (EOP) during transmission, and performs processing of detecting and deleting EOP during reception. The SYNC generation-deletion circuit 23 performs processing of generating and adding SYNC (synchronization code) during transmission, and performs processing of detecting and deleting SYNC during reception.

The NRZI encoder 24 performs data encode processing by an NRZI (Non Return to Zero Invert) method during transmission. The NRZI decoder 25 performs decode processing of NRZI encoded data during reception.

In the NRZI encoding, the preceding signal level is maintained when the bit of the original data is "1" (first signal level), and the preceding signal level is inverted when the bit of the original data is "0" (second signal level). Therefore, when "0" bits continue in the original data, the signal level of the encoded data is changed in bit units. However, when "1" bits continue in the original data, a state in which the signal level of the encoded data is not changed continues for a long time, whereby a desynchronization problem occurs.

Therefore, the bit-stuffing circuit 26 performs bit-insertion processing (processing of inserting a bit at the second signal level on condition that bits at the first signal level have continued a given number of times) during transmission. In more detail, when "1" bits have continued six times, the bit-stuffing circuit 26 inserts a "0" bit. The bit-unstuffing circuit 27 performs bit-deletion processing (processing of deleting a bit at the second signal level inserted on condition that bits at the first signal level have continued a given number of times) during reception. In more detail, when "1" bits have continued six times and a "0" bit has been inserted thereafter, the bit-unstuffing circuit 27 deletes the "0" bit.

The parallel/serial conversion circuit 28 performs processing of converting transmission target parallel data into serial data during transmission. The serial/parallel conversion circuit 29 performs processing of converting received serial data into parallel data during reception. This enables serial transfer using the differential signal lines.

The serial/parallel conversion circuit 29 has a function of an elasticity buffer for absorbing a clock frequency difference (clock drift) between the internal device (data transfer control device) and an external device connected with the USB and the like, in addition to the serial/parallel conversion function.

The EOP generation-deletion circuit 22, the SYNC generation-deletion circuit 23, the NRZI encoder 24, the NRZI decoder 25, the bit-stuffing circuit 26, and the bit-unstuffing circuit 27 are low-speed logic circuits which operate at 60 MHz, for example. The parallel/serial conversion circuit 28, the serial/parallel conversion circuit 29, and the sampling clock generation circuit (DLL) 31 are high-speed logic circuits which operate at 480 MHz, for example.

The analog front-end circuit 40 includes upstream differential signal lines DPUP and DMUP connected with the upstream port UPPT, and downstream differential signal lines DPDW and DMDW connected with the downstream port DWPT. The analog front-end circuit 40 includes common differential signal lines DPCM and DMCM used in common for the upstream port UPPT and the downstream port DWPT.

The analog front-end circuit 40 includes HS transmission drivers 42 and 43, single-ended receivers 44, 45, 46, and 47, an FS transmission driver 48, an FS differential receiver 50, an HS differential receiver 52, detection circuits 54 and 56, a pull-up circuit 58, and switch circuits 60 and 62.

The HS transmission driver 42 (first transmission driver in a broad sense) is an HS mode (first transfer mode) driver (current driver) of which outputs are connected with the upstream differential signal lines DPUP and DMUP. The HS transmission driver 43 (second transmission driver in a broad sense) is an HS mode driver of which outputs are connected with the downstream differential signal lines DPDW and DMDW. Serial data transmission at 480 MHz is enabled by the HS transmission drivers 42 and 43.

In more detail, the HS transmission driver 42 receives differential transmission digital signals (positive-side digital signal and negative-side digital signal) from the logic circuit 20 in the preceding stage through the switch circuit 60, and drives current through the differential signal lines DPUP and DMUP. The HS transmission driver 43 receives differential transmission digital signals from the logic circuit 20 in the preceding stage through the switch circuit 60, and drives current through the differential signal lines DPDW and DMDW. Specifically, the HS transmission drivers 42 and 43 generate a USB J state or K state by driving the differential signal lines at a predetermined current value. The HS transmission drivers 42 and 43 are subjected to output enable control and drive current control based on control signals from the logic circuit 20.

The single-ended receivers 44 and 45 are FS mode (second transfer mode) receivers respectively connected with the upstream positive-side signal line DPUP and the upstream negative-side signal line DMUP. The single-ended receivers 44 and 45 amplify signals from the signal lines DPUP and DMUP, and output the amplified signals to the logic circuit 20. The line state of the signal lines DPUP and DMUP can be monitored by using the single-ended receivers 44 and 45.

The single-ended receivers 46 and 47 are FS mode receivers respectively connected with the downstream positive-side signal line DPDW and the downstream negative-side signal line DMDW. The single-ended receivers 46 and 47 amplify signals from the signal lines DPDW and DMDW, and output the amplified signals to the logic circuit 20. The line state of the signal lines DPDW and DMDW can be monitored by using the single-ended receivers 46 and 47.

The FS transmission driver 48 (third transmission driver in a broad sense) is an FS mode (second transfer mode) transmission driver of which outputs are connected with the common differential signal lines DPCM and DMCM. The FS transmission driver 48 drives (voltage-drives) the differential signal lines so that serial data transferred at 12 MHz can be transmitted through the USB in the FS mode. A clamping resistor (termination resistor) is provided at the output of the FS transmission driver 48. The FS transmission driver 48 outputs SE0 (positive-side and negative-side outputs are set at low level) as an HS termination in the HS mode.

The FS differential receiver 50 is an FS mode differential receiver of which inputs are connected with the common differential signal lines DPCM and DMCM. The FS differential receiver 50 amplifies the differential signals input through the differential signal lines so that serial data transferred at 12 MHz can be received through the USB in the FS mode.

The HS differential receiver 52 is an HS mode (first transfer mode) differential receiver of which inputs are connected with the common differential signal lines DPCM and DMCM. The HS differential receiver 52 amplifies the differential signals input through the differential signal lines so that serial data transferred at 480 MHz can be received through the USB in the HS mode. The HS differential receiver 52 is used not only during normal data reception, but also during chirp reception.

The detection circuit 54 (transmission envelope detector or squelch circuit) is a circuit which detects whether or not the differential signal data is valid or invalid, and performs detection processing for distinguishing serial data transferred at 480 MHz from noise. In more detail, the data is classed as valid when the amplitude of the differential signals exceeds a squelch threshold value. When the detection circuit 54 has detected that the differential signal data is valid, output of the received digital signal from the HS differential receiver 52 to the logic circuit 20 is enabled.

The detection circuit 56 (disconnection envelope detector) is a circuit which detects disconnection of the USB (USB cable) during the host operation in the HS mode. In more detail, the detection circuit 56 detects disconnection when the amplitude of the differential signals becomes equal to or higher than a predetermined voltage. In the FS mode, disconnection can be detected by using the single-ended receiver. During the device operation, disconnection can be detected by monitoring VBUS.

The pull-up circuit 58 is a circuit for pulling up the positive-side differential signal line, and includes a pull-up resistor RU and a switch SWU. A dummy circuit (resistor RD and switch SWD) is provided to the negative-side differential signal line.

The switch circuit 60 (first switch circuit; analog switch circuit) connects the input of the upstream HS transmission driver 42 with the output of the logic circuit 20 (transmission digital signal output circuit) during the upstream connection. The switch circuit 60 connects the input of the downstream HS transmission driver 43 with the output of the logic circuit 20 during the downstream connection. Specifically, a switch SW1 is switched to the UPPT side during the upstream connection in which the partner-side electronic instrument (second electronic instrument) is connected with the upstream port UPPT, and switched to the DWPT side during the downstream connection in which the partner-side electronic instrument is connected with the downstream port DWPT.

The switch circuit 62 (second switch circuit; analog switch circuit) connects the upstream differential signal lines DPUP and DMUP with the common differential signal lines DPCM and DMCM, respectively, during the upstream connection. The switch circuit 62 connects the downstream differential signal lines DPDW and DMDW with the common differential signal lines DPCM and DMCM, respectively, during the downstream connection. Specifically, switches SW2 and SW3 are switched to the UPPT side during the upstream connection, and switched to the DWPT side during the downstream connection.

The switch circuits 60 and 62 switch connection to the downstream connection when connection of the partner-side electronic instrument (second electronic instrument) with the downstream port DWPT has been detected. In more detail, connection of the partner-side electronic instrument with the downstream port DWPT is precedently detected, and the switches SW1, SW2, and SW3 are switched to the downstream side when connection of the partner-side electronic instrument with the downstream port DWPT has been detected. When connection of the partner-side electronic instrument with the downstream port DWPT has not been detected, connection of the partner-side electronic instrument with the upstream port UPPT is detected. When connection of the partner-side electronic instrument with the upstream port UPPT has been detected, the switches SW1, SW2, and SW3 are switched to the upstream side.

7. Individual Use of HS Transmission Drivers and Common Use of FS Transmission Driver In the embodiment, as shown in FIG. 11, while the high-speed HS transmission drivers 42 and 43 (first and second transmission drivers) are separately provided, the low-speed FS transmission driver 48 is used in common during the upstream connection and the downstream connection.

In more detail, the HS transmission driver 42, of which the outputs are connected with the differential signal lines DPUP and DMUP, and the HS transmission driver 43, of which the outputs are connected with the differential signal lines DPDW and DMDW, are separately provided, and the switch circuit 60 is provided. The output of the logic circuit 20 is connected with the input of the HS transmission driver 42 through the switch circuit 60 during the upstream connection, so that the differential signal lines DPUP and DMUP are driven by the HS transmission driver 42 to achieve HS transmission in the upstream direction. The output of the logic circuit 20 is connected with the input of the HS transmission driver 43 through the switch circuit 60 during the downstream connection, so that the differential signal lines DPDW and DMDW are driven by the HS transmission driver 43 to achieve HS transmission in the downstream direction.

The low-speed FS transmission driver 48 is used in common during the downstream connection and the upstream connection. In more detail, the FS transmission driver 48 is connected with the common differential signal lines DPCM and DMCM, and the switch circuit 62 is provided. The outputs of the FS transmission driver 48 are connected with the differential signal lines DPUP and DMUP during the upstream connection through the common differential signal lines DPCM and DMCM and the switch circuit 62, so that the differential signal lines DPUP and DMUP are driven by the FS transmission driver 48 to achieve FS transmission in the upstream direction. The outputs of the FS transmission driver 48 are connected with the differential signal lines DPDW and DMDW during the downstream connection through the common differential signal lines DPCM and DMCM and the switch circuit 62, so that the differential signal lines DPDW and DMDW are driven by the FS transmission driver 48 to achieve FS transmission in the downstream direction.

The above-described configuration, in which the high-speed HS transmission drivers 42 and 43 are separately provided and the low-speed FS transmission driver 48 is used in common during the upstream connection and the downstream connection, has an advantage in that the circuit scale can be reduced while maintaining the quality of the signal characteristics such as the eye pattern.

In the USB 2.0 standard, the HS transmission drivers 42 and 43 must drive current through the differential signal lines at a high speed (480 MHz). Therefore, if the switch circuit is provided at the outputs of the HS transmission drivers 42 and 43, a problem such as an impedance mismatch occurs due to the parasitic resistance of the switch circuit or the like, whereby the quality of the signal characteristics may deteriorate.

According to the embodiment, the upstream HS transmission driver 42 and the downstream HS transmission driver 43 are separately provided, and the switch circuit is not provided at the outputs of the HS transmission drivers 42 and 43. Therefore, an impedance mismatch due to the parasitic resistance of the switch circuit does not occur. Moreover, even if the switch circuit 60 is provided at the inputs of the HS transmission drivers 42 and 43, since the impedance of the parasitic resistance of the switch circuit 60 does not affect the partner-side electronic instrument connected through the USB, the quality of the signal characteristics is affected to only a small extent. Therefore, the resistance parasitic to the outputs of the HS transmission drivers 42 and 43 can be minimized in the HS transfer for which the quality of the signal characteristics such as the eye pattern is highly required, whereby high-quality signal characteristics can be maintained.

On the other hand, if the upstream FS transmission driver and the downstream FS transmission driver are separately provided for the low-speed (12 MHz) FS transfer, the number of unnecessary circuit sections is increased.

According to the embodiment, since the FS transmission driver 48 is used in common during the downstream connection and the upstream connection, the circuit scale can be reduced by reducing the number of unnecessary circuit sections. In the FS transfer for which high-quality signal characteristics are not required, deterioration of the quality of the signal characteristics does not pose a practical problem even if the switch circuit 62 having a parasitic resistance is provided at the outputs of the FS transmission driver 48. As described above, according to the embodiment, the circuit scale can be reduced while maintaining the quality of the signal characteristics.

8. Individual Use of HS Transmission Drivers and Common Use of Differential Receiver and Detection Circuit In the embodiment, as shown in FIG. 11, while the HS transmission drivers 42 and 43 are separately provided, the HS differential receiver 52 and the detection circuit 54 are used in common during the upstream connection and the downstream connection.

High-quality signal characteristics can be maintained as described above by separately providing the HS transmission drivers 42 and 43. On the other hand, even if the switch circuit 62 is provided at the inputs of the HS differential receiver 52 and the detection circuit 54, the parasitic resistance of the switch circuit 62 does not adversely affect the signal reception performance to a large extent.

Specifically, the performance and the electrical characteristics of the data transfer control device of the partner-side electronic instrument connected through the USB differ depending on the data transfer control device. Therefore, in order to transmit a signal in an appropriate eye pattern conforming to the USB standard irrespective of the performance and the electrical characteristics of the partner device, it is undesirable to provide the switch circuit having a parasitic resistance at the outputs of the HS transmission drivers 42 and 43.

On the other hand, a signal in an eye pattern conforming to the USB standard is expected to be transferred from the partner-side electronic instrument through the USB during reception. Therefore, appropriate data reception can be realized by designing the HS differential receiver 52 and the detection circuit 54, taking into consideration the parasitic resistance of the switch circuit 62, so that a signal in an eye pattern within the range of the standard can be appropriately received. Therefore, the signal reception performance is not adversely affected to a large extent, even if the switch circuit 62 is provided at the inputs of the HS differential receiver 52 and the detection circuit 54. The HS differential receiver 52 and the detection circuit 54 can be used in common during the upstream connection and the downstream connection by providing the switch circuit 62, whereby the circuit scale can be reduced.

Figure 12:
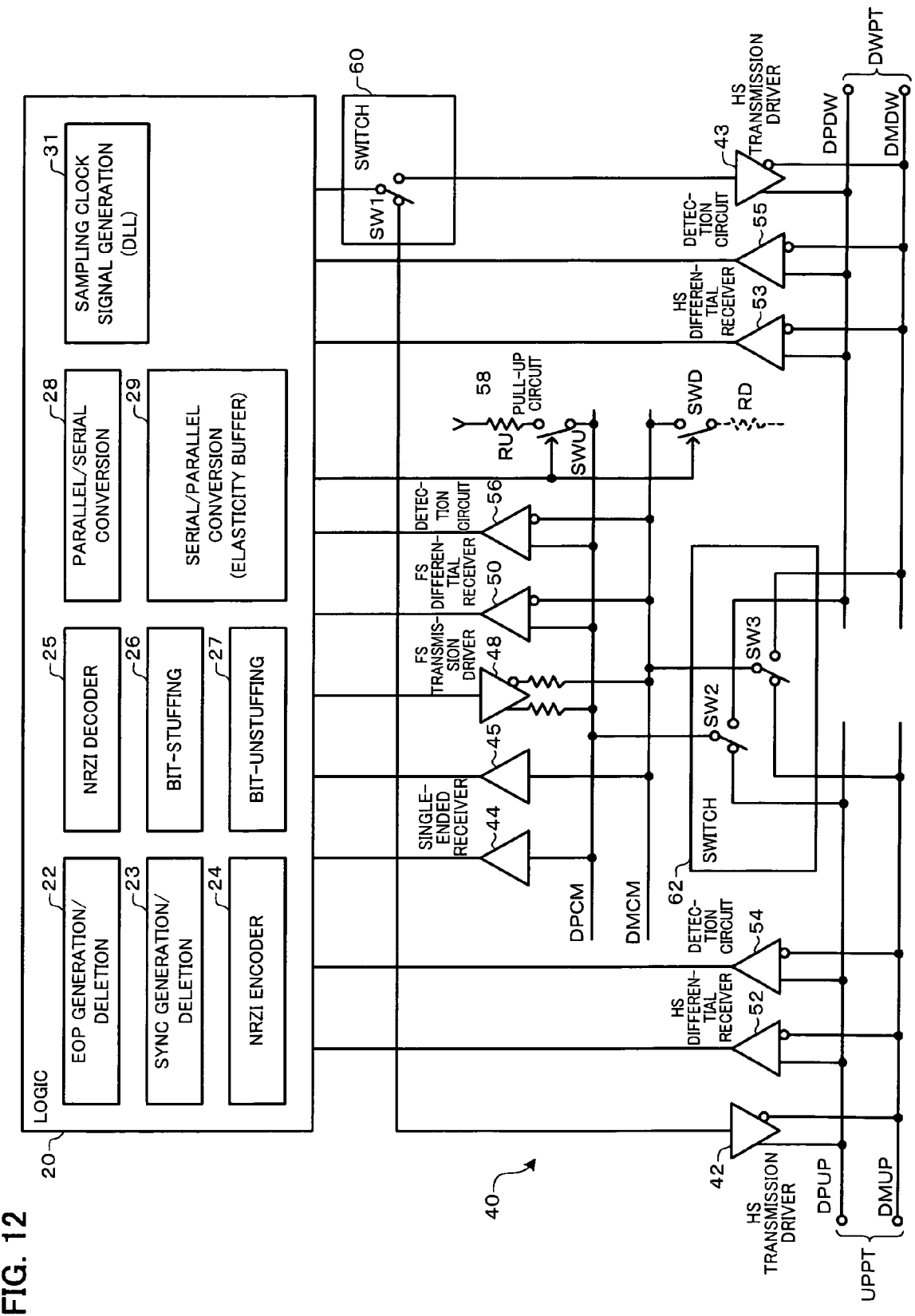
FIG. 12 is a modification of a transceiver.

As shown in a modification of the embodiment shown in FIG. 12, the HS differential receiver and the detection circuit may be separately provided without using the HS differential receiver and the detection circuit in common during both the downstream connection and the upstream connection. In FIG. 12, the inputs of the upstream HS differential receiver 52 and the upstream detection circuit 54 (squelch circuit) are connected with the upstream differential signal lines DPUP and DMUP. The inputs of a downstream HS differential receiver 53 and a downstream detection circuit 55 (squelch circuit) are connected with the downstream differential signal lines DPDW and DMDW.

It is unnecessary to provide the switch circuit having a parasitic resistance by separately providing the upstream HS differential receiver 52 and the upstream detection circuit 54 from the downstream HS differential receiver 53 and the downstream detection circuit 55 (squelch circuit). Therefore, even if the performance and the electrical characteristics of the HS differential driver of the partner-side electronic instrument do not conform to the USB standard, appropriate data reception can be realized. Note that only one of the HS differential receiver and the detection circuit may be used in common during the downstream connection and the upstream connection. In addition, an upstream FS transmission driver and a downstream FS transmission driver may be separately provided without using the FS transmission driver in common during the downstream connection and the upstream connection.

9. Common Use of Single-Ended Receiver

In FIG. 11, the upstream single-ended receivers 44 and 45 (first and second single-ended receivers) and the downstream single-ended receivers 46 and 47 (third and fourth single-ended receivers) are separately provided without using the single-ended receiver in common during the downstream connection and the upstream connection. Specifically, the upstream single-ended receivers 44 and 45 are connected with the upstream positive-side signal line DPUP and the upstream negative-side signal line DMUP, respectively. The downstream single-ended receivers 46 and 47 are connected with the downstream positive-side signal line DPDW and the downstream negative-side signal line DMDW, respectively.

This enables the line state of the signal lines DPUP and DMUP to be monitored by using the single-ended receivers 44 and 45, and enables the line state of the signal lines DPDW and DMDW to be monitored by using the single-ended receivers 46 and 47. This realizes appropriate data transfer control through the USB. Moreover, since the line state detection of the upstream port UPPT (e.g. detection of connection of electronic instrument) and the line state detection of the downstream port DWPT can be independently performed, line state detection control can be simplified.

Figure 13:
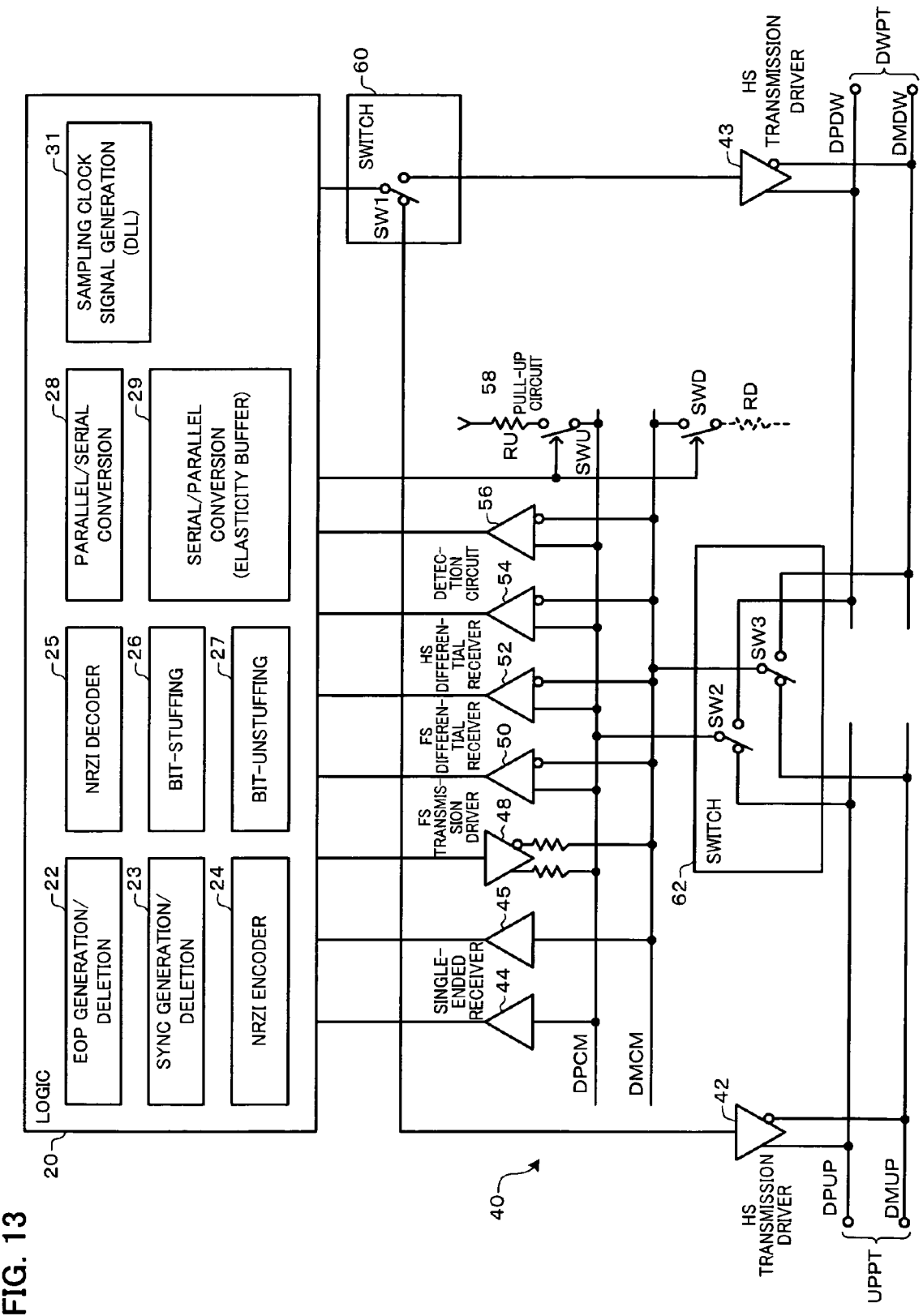
FIG. 13 is a modification of a transceiver.

However, a configuration in which the single-ended receiver is used in common during the downstream connection and the upstream connection may be employed as shown in the modifications of the embodiment shown in FIGS. 12 and 13. In FIGS. 12 and 13, the single-ended receivers 44 and 45 are connected with the positive-side signal line DPCM and the negative-side signal line DMCM of the common differential signal lines, respectively. The line state of the upstream port UPPT can be detected by connecting the inputs of the single-ended receivers 44 and 45 with the signal lines DPUP and DMUP through the common differential signal lines DPCM and DMCM and the switch circuit 62. The line state of the downstream port DWPT can be detected by connecting the inputs of the single-ended receivers 44 and 45 with the signal lines DPDW and DMDW through the common differential signal lines DPCM and DMCM and the switch circuit 62. The number of single-ended receivers can be reduced in comparison with FIG. 11 by using the single-ended receivers as shown in FIGS. 12 and 13, whereby the circuit scale can be reduced.

10. Configuration Example of Analog Circuit

A configuration example of each analog circuit included in the analog front-end circuit 40 is described below.

Figure 14:
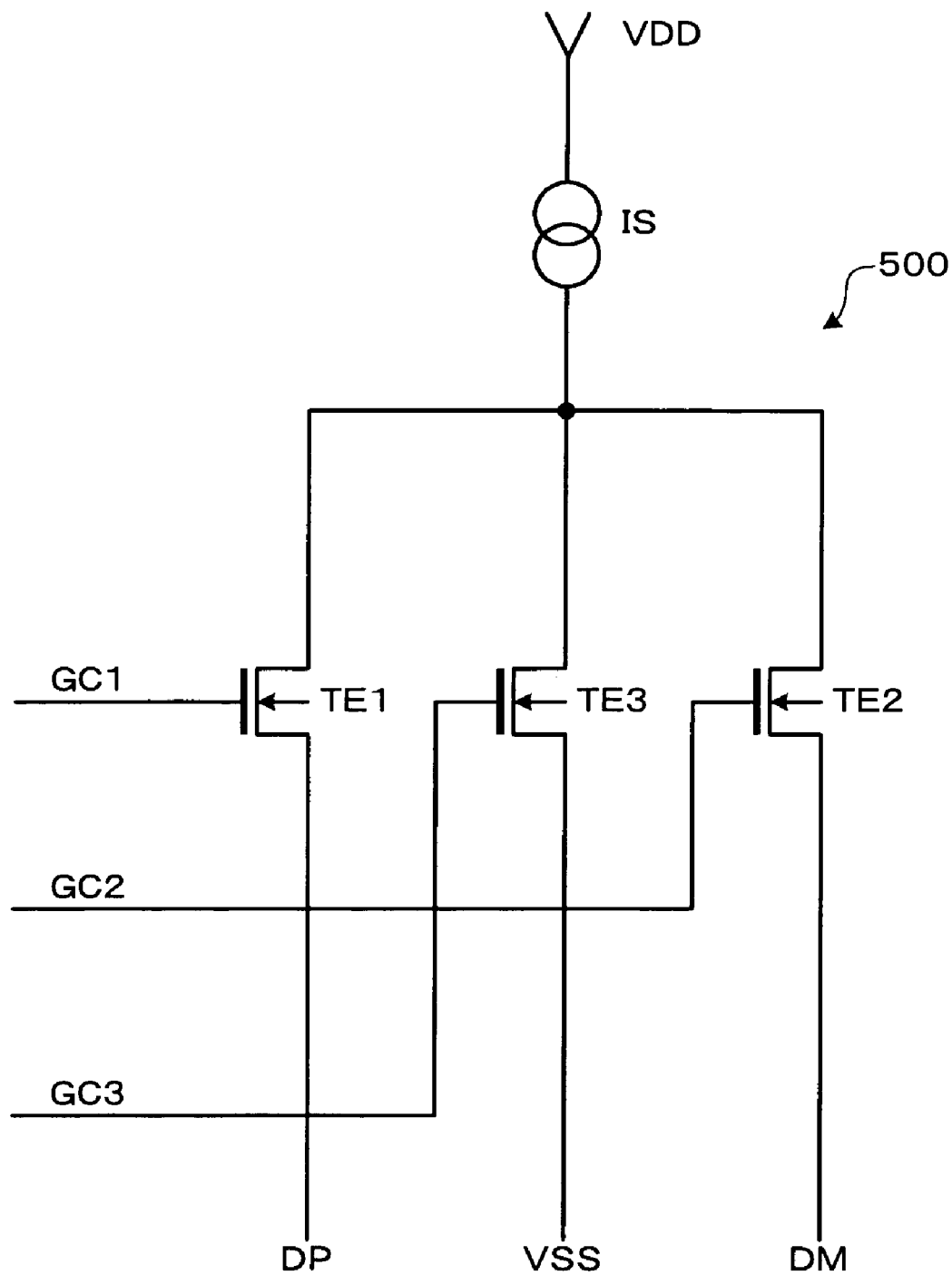
FIG. 14 is a configuration example of an HS transmission driver.

FIG. 14 shows an example of an HS transmission driver 500 (42 and 43 in FIG. 11). The HS transmission driver 500 includes a current source IS and N-type transistors TE1, TE2, and TE3 (first, second, and third transistors in a broad sense). Control signals GC1, GC2, and GC3 (transmission digital signals) shown in FIG. 14 are input to the HS transmission driver from the logic circuit 20 shown in FIG. 11 through the switch circuit 60.

The control signals GC1 and GC2 are signals, one of which is set to active and the other set to non-active (non-overlapping signals of which active and non-active are exclusively controlled). When the control signal GC1 goes active (high level), current (constant current) flows through the positive-side differential signal line DP from the current source IS connected with a power supply line VDD (first power supply line in a broad sense) through the transistor TE1, whereby the USB line state (bus state) is changed to the J state. When the control signal GC2 goes active, current flows through the negative-side differential signal line DM from the current source IS through the transistor TE2, whereby the USB line state is changed to the K state. An HS mode transmission can be performed by setting the USB line state to the J or K state corresponding to the transmission data.

The control signal GC3 goes active in a period other than the transmission (HS transmission) period, whereby current flows through a power supply line VSS (second power supply line in a broad sense) from the current source IS through the transistor TE3. This enables a stable current to flow immediately after the start of transmission, whereby the response of the HS transmission driver can be improved.

Figure 15:
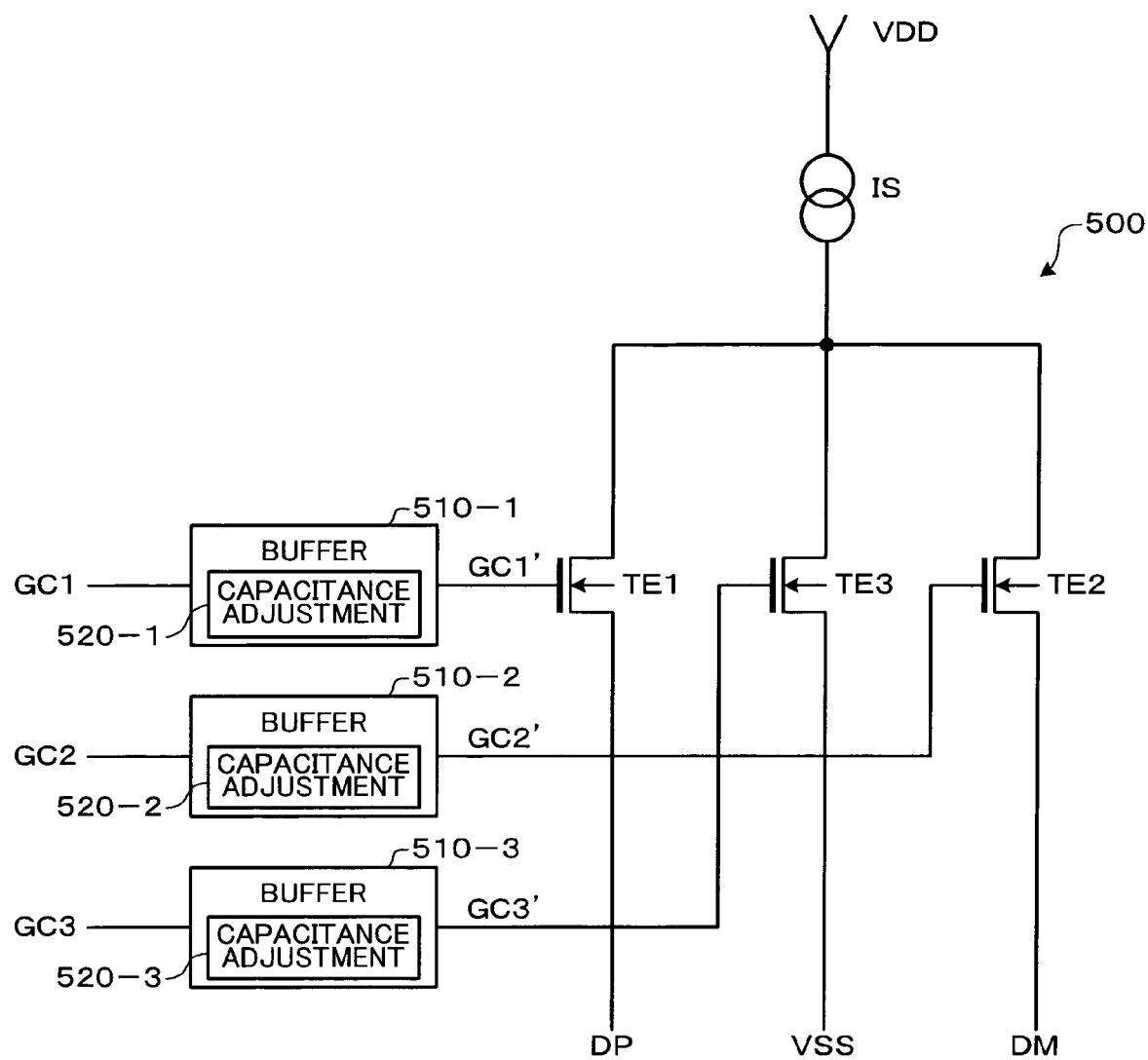
FIG. 15 is another configuration example of an HS transmission driver.

The HS transmission driver 500 may further include buffer circuits 510-1, 510-2, and 510-3 as shown in FIG. 15. The buffer circuits 510-1, 510-2, and 510-3 receive the control signals GC1, GC2, and GC3, and output control signals GC1', GC2', and GC3' to gates of the transistors TE1, TE2, and TE3, respectively. The buffer circuits 510-1, 510-2, and 510-3 respectively include capacitance adjustment circuits 520-1, 520-2, and 520-3. The output waveform of the HS transmission driver 500 (transmission circuit) can be adjusted to an arbitrary waveform by providing the capacitance adjustment circuits 520-1, 520-2, and 520-3 and adjusting the capacitance. Specifically, the eye pattern can be adjusted by adjusting the slew rate of the HS transmission driver 500. This enables selection of an optimum slew rate (potential gradient) corresponding to the transmission path and the substrate. Therefore, accurate data transfer using the differential signals can be realized, even if the differential receiver or the like of the partner-side electronic instrument (second electronic instrument) connected through the USB does not completely conform to the USB standard (given interface standard in a broad sense).

Figure 16:
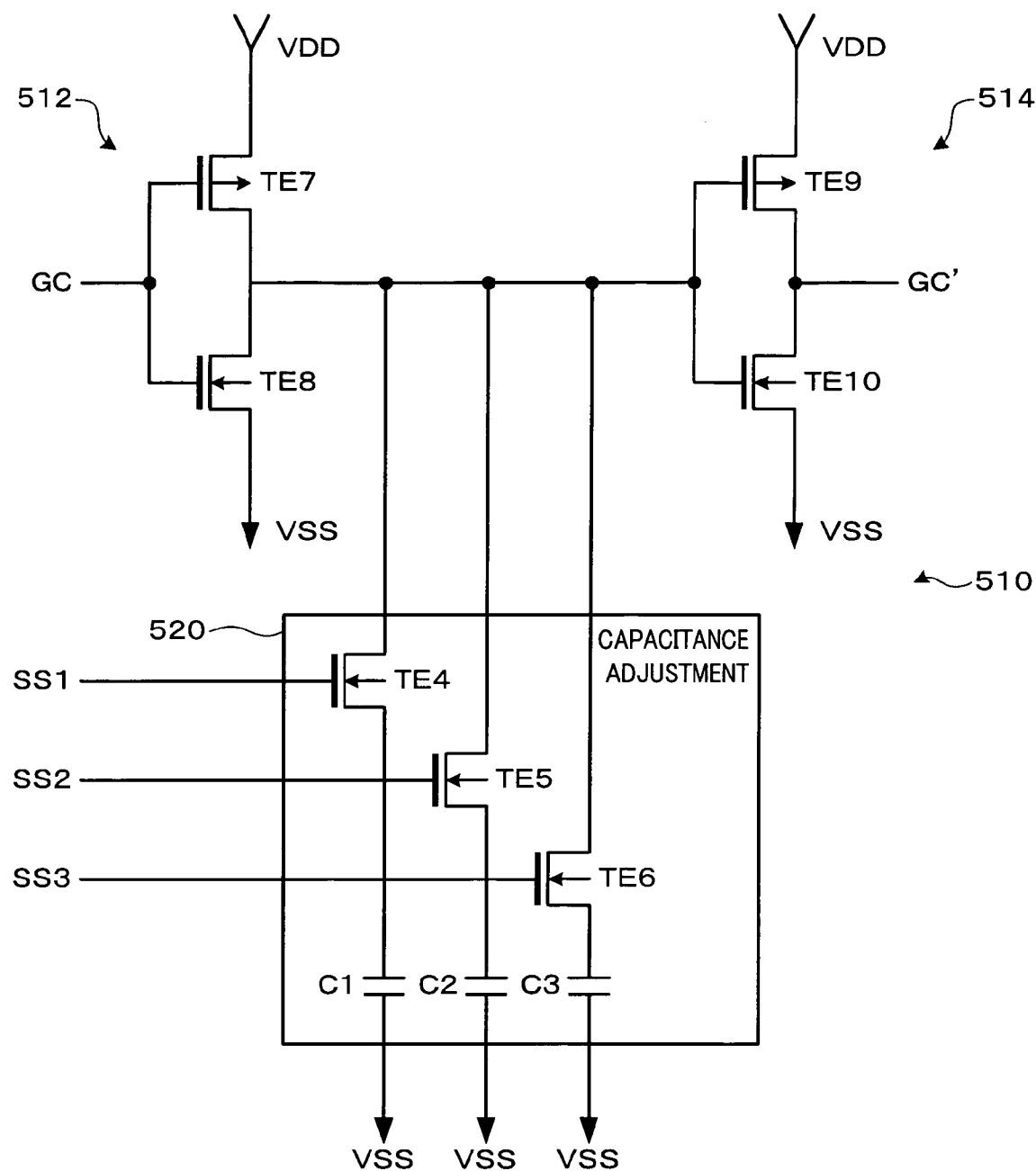
FIG. 16 is a configuration example of a buffer circuit.

FIG. 16 shows a configuration example of the buffer circuit 510 (510-1, 510-2, 510-3) and the capacitance adjustment circuit 520 (520-1, 520-2, 520-3)). The buffer circuit 510 includes an inverter circuit 512, and an inverter circuit 514 of which an input node is connected with an output node of the inverter circuit 512. The capacitance adjustment circuit 520 is connected with the output node of the inverter circuit 512. The capacitance adjustment circuit 520 includes transistors TE4, TE5, and TE6 of which gates are respectively controlled by capacitance adjustment signals SS1, SS2, and SS3, and capacitor elements C1, C2, and C3. The wiring capacity of the output node of the inverter circuit 512 (input node of the inverter circuit 514) can be adjusted to an arbitrary value by setting the levels of the capacitance adjustment signals SS1, SS2, and SS3 to various values, whereby the slew rate of the output of the HS transmission driver 500 can be adjusted. As the capacitor elements C1, C2, and C3, a gate capacitor of a MOS transistor may be used, or a capacitor formed between first and second polysilicon interconnects may be used.

Figures 17A, 17B:
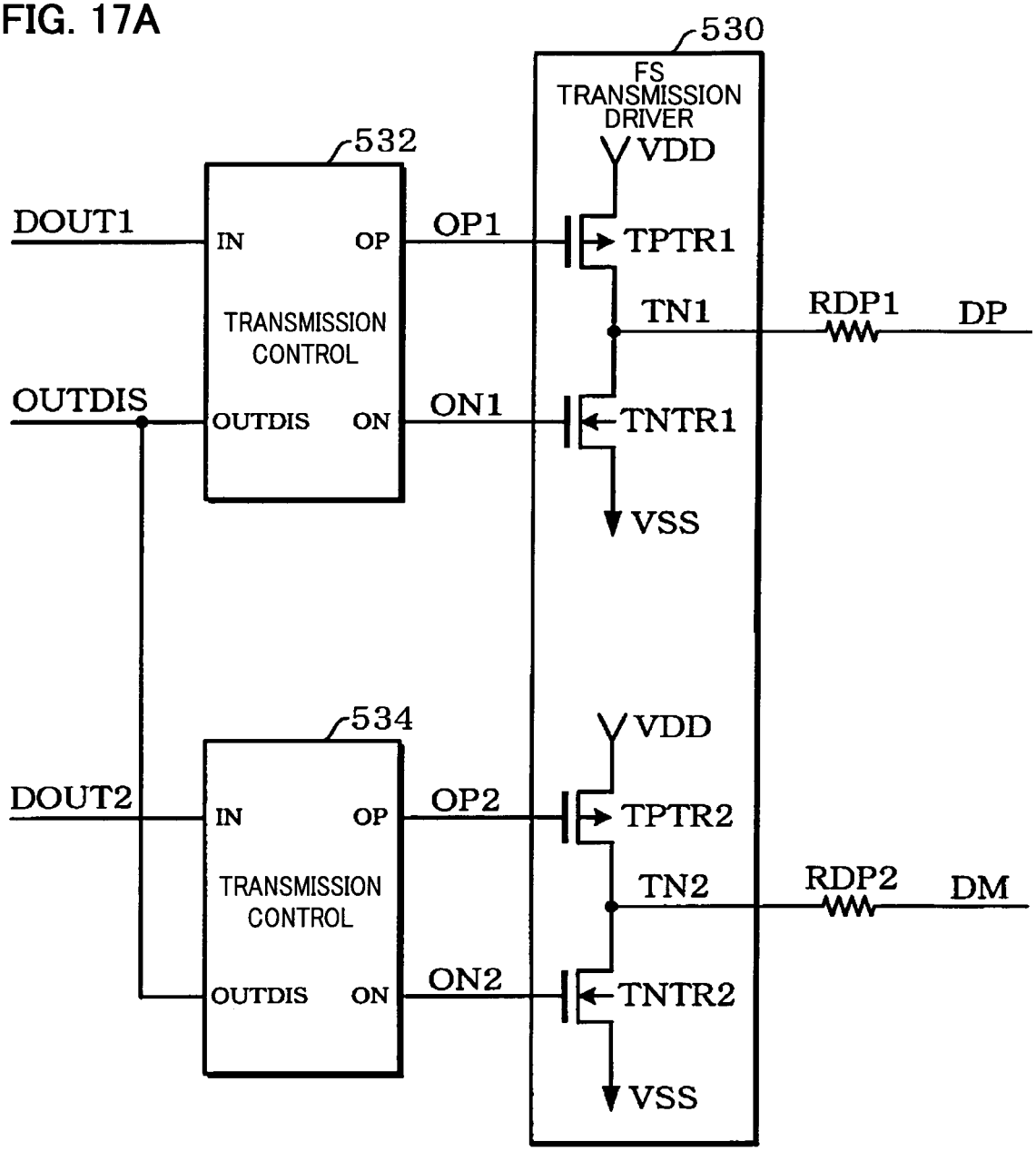
FIGS. 17A and 17B show a configuration example of an FS transmission circuit and a truth table.

FIG. 17A shows a configuration example of an FS transmission driver 530 (48 in FIG. 11) and transmission control circuits 532 and 534 which control the FS transmission driver 530. The transmission control circuits 532 and 534 may be included in the logic circuit 20 shown in FIG. 11.

The FS transmission driver 530 includes a P-type transistor TPTR1 and an N-type transistor TNTR1 connected in series between the power supply lines VDD and VSS (first and second power supply lines), and a P-type transistor TPTR2 and an N-type transistor TNTR2 connected in series between the power supply lines VDD and VSS. A damping resistor RDP1 is provided between an output node TN1 and a node of the differential signal line DP, and a damping resistor RDP2 is provided between an output node TN2 and a node of the differential signal line DM.

The transmission control circuit 532 receives signals DOUT1 and OUTDIS from the circuit in the preceding stage, and performs a logical operation according to a truth table shown in FIG. 17B to output signals OP1 and ON1 to the FS transmission driver 530. The transmission control circuit 534 receives signals DOUT2 and OUTDIS from the circuit in the preceding stage, and performs a logical operation according to the truth table shown in FIG. 17B to output signals OP2 and ON2 to the transmission driver 530.

Figure 18:
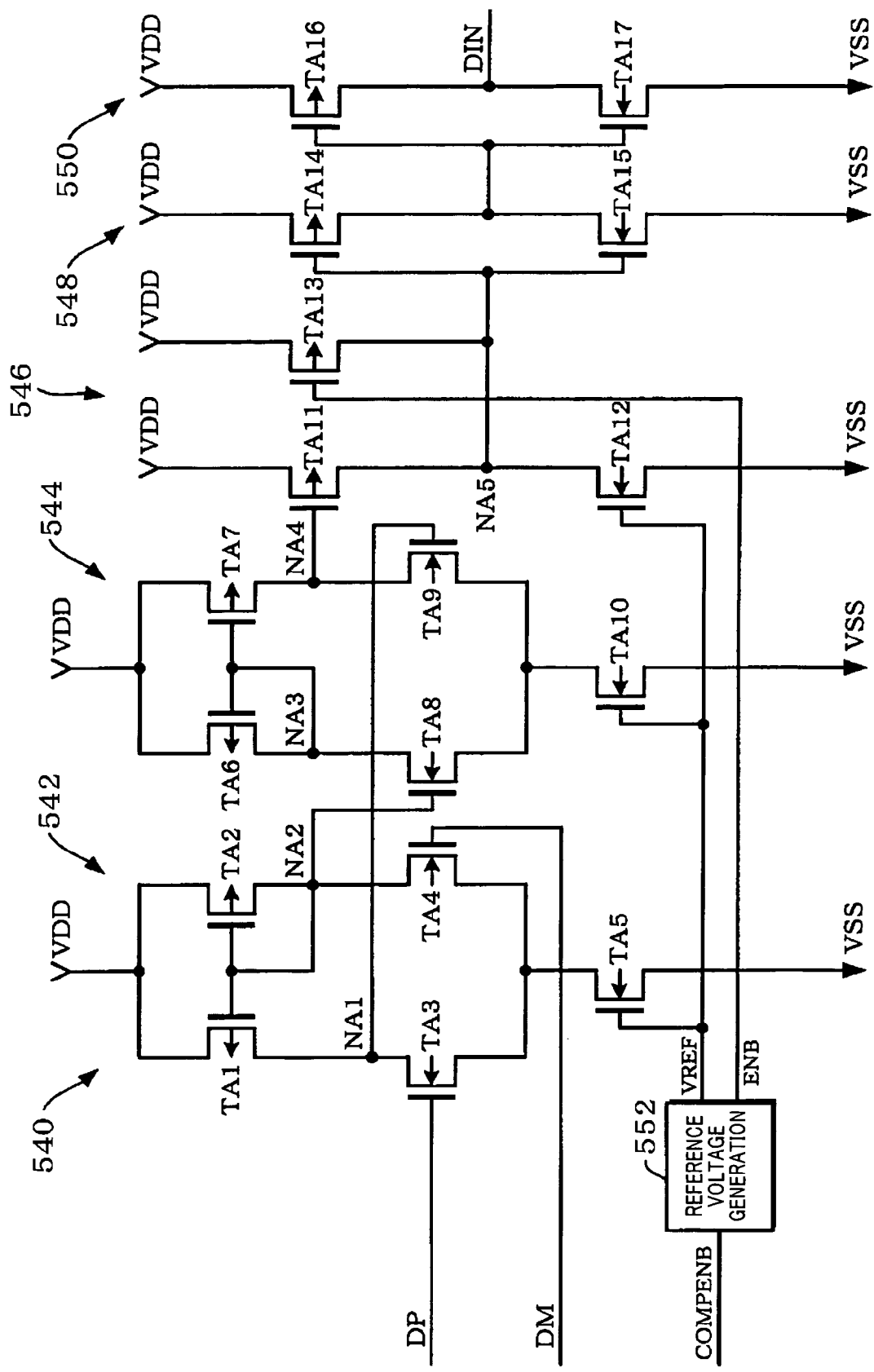
FIG. 18 is a configuration example of a differential receiver.

FIG. 18 shows a configuration example of an FS differential receiver 540 (50 in FIG. 11). The FS differential receiver 540 includes operational amplifier circuits 542 and 544, an output circuit 546, inverter circuits 548 and 550, and a reference voltage generation circuit 552. An HS differential receiver (52 in FIG. 11) may be configured in the same manner as shown in FIG. 18.

The signals (differential signals) from the differential signal lines DP and DM are input to gates of transistor TA3 and TA4 which are first and second differential inputs of the operational amplifier circuit 542. Signals output from output nodes NA2 and NA1 of the operational amplifier circuit 542 are input to gates of transistors TA8 and TA9 which are first and second differential inputs of the operational amplifier circuit 544. A signal output from an output node NA4 of the operational amplifier circuit 544 is input to a gate of a transistor TA11 of the output circuit 546. A signal output from an output node NA5 of the output circuit 546 is buffered by an inverter circuit 548 formed by transistors TA14 and TA15 and an inverter circuit 550 formed by transistors TA16 and TA17, and is output as a signal DIN.

The reference voltage generation circuit 552 receives a comparator enable signal COMPENB, and outputs a reference voltage VREF and an enable signal ENB. The reference voltage VREF is input to gates of transistors TA5, TA10, and TA12 which make up a current source. The enable signal ENB is input to a gate of a transistor TA13 of the output circuit 546.

Figure 19:
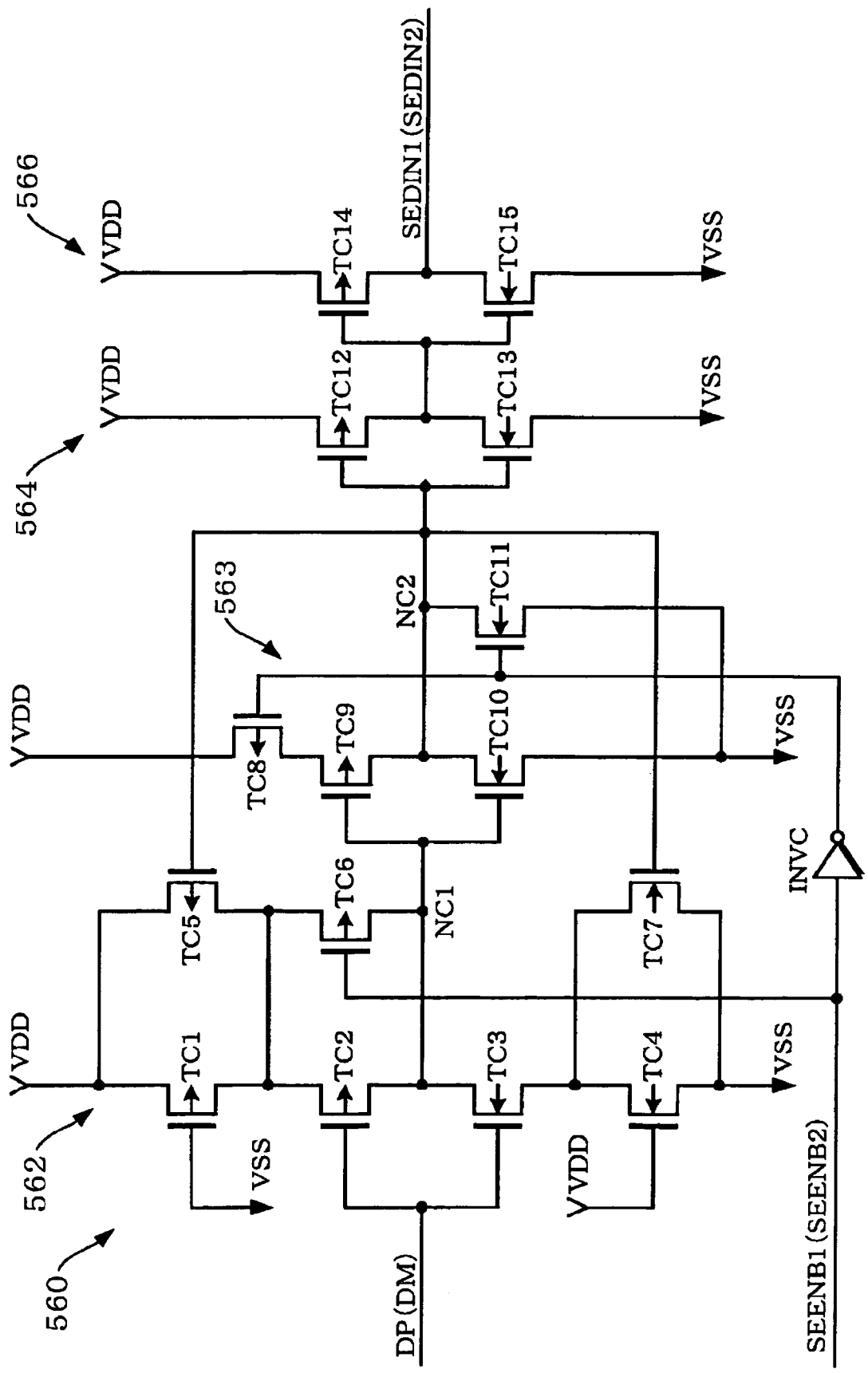
FIG. 19 is a configuration example of a single-ended receiver.

FIG. 19 shows a configuration example of a single-ended receiver 560 (44, 45, 46, and 47 in FIG. 11). The single-ended receiver 560 includes a buffer circuit 562 having threshold voltage hysteresis characteristics, and inverter circuits 564 and 566.

The signal from the differential signal line DP (or DM) is input to gates of transistor TC3 and TC4 of the buffer circuit 562. A signal output from an output node NC2 of the buffer circuit 562 is buffered by the inverter circuit 564 formed by transistors TC12 and TC13 and the inverter circuit 566 formed by transistors TC14 and TC15, and is output as a signal SEDIN1 (SEDIN2).

A transistor TC6 is turned ON when the enable signal SEENB1 is set at the low level (non-active), whereby the voltage of a node NC1 is set at VDD. A transistor TC11 is also turned ON, whereby the voltage of a node NC2 is set at VSS. A transistor TC8 is turned OFF, whereby current flowing through a feedback inverter circuit 563 is interrupted. As a result, current flowing through the single-ended receiver 560 can be interrupted (limited), whereby power consumption can be reduced.

Figure 20:
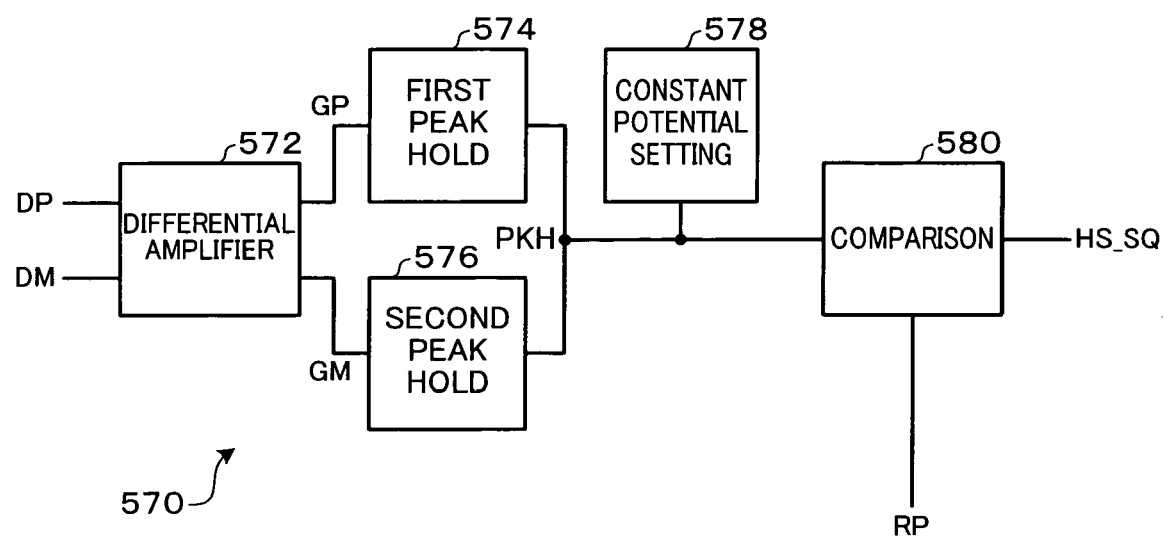
FIG. 20 is a configuration example of a detection circuit.

FIG. 20 shows a configuration example of a detection circuit 570 (54 and 56 in FIG. 11). The detection circuit 570 includes a differential amplifier circuit 572, first and second peak hold circuits 574 and 576, a constant potential setting circuit 578, and a comparison circuit 580.

The differential amplifier circuit 572 amplifies the differential voltage between the differential input signals from the differential signal lines DP and DM, and generates differential output signals GP and GM. The first peak hold circuit 574 detects the peak value of the differential output signal GP, and holds the peak value at a node PKH. The second peak hold circuit 576 detects the peak value of the other differential output signal GM, and holds the peak value at the node PKH. The constant potential setting circuit 578 returns the potential of the node PKH to a constant potential corresponding to the signal undetected state at a time constant which causes a change slower than the potential change rate of the node PKH. The comparison circuit 580 compares a reference potential RP with the potential of the node PKH, and outputs the comparison result as HS_SQ.

As described above, the detection circuit 570 shown in FIG. 20 holds the peak values of the differential output signals GP and GM obtained based on the signals from the differential signal lines DP and DM at the node PKH, and returns the potential of the node PKH to a constant potential associated with the signal undetected state at a low time constant. The detection circuit 570 then compares the potential of the node PKH with the reference level RP. Therefore, the detection circuit 570 can determine whether the received data is valid or invalid and the like with high accuracy even if the differential input signals from the differential signal lines DP and DM have a minute amplitude and are high-speed. The setting of the filter constant and the threshold level differs between the detection circuits 54 and 56 shown in FIG. 11.

The invention is not limited to the above-described embodiment. Various modifications and variations may be made within the scope of the invention. For example, the terms (e.g. HS mode, FS mode, first port, second port, HS transmission driver, FS transmission driver, and USB) cited in the description in the specification or the drawings as the terms in a broad sense or in a similar sense (e.g. first transfer mode, second transfer mode, upstream port, downstream port, transmission driver for the first transfer mode, transmission driver for the second transfer mode, and serial bus) may be replaced by the terms in a broad sense or in a similar sense in another description in the specification or the drawings.

The configuration of the electronic instrument of the invention is not limited to the configuration shown in FIGS. 1A, 1B, 7 to 13, etc. Various modifications and variations may be made. For example, some of the constituent elements in these drawings may be omitted, or the connection relationship of the constituent elements may be changed.

The invention may be applied to various electronic instruments (e.g. portable music player, portable image player, portable telephone, portable information terminal, PDA, electronic dictionary, or electronic notebook).

The embodiment illustrates an example of application to data transfer according to the USB standard. However, the invention may be applied to data transfer according to a standard based on the same idea as the USB standard, a standard developed from the USB standard, or a standard other than the USB standard (e.g. high-speed serial interface such as IEEE 1394).

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. An electronic instrument, comprising:
an upstream port provided on a first side surface of the electronic instrument;
a downstream port provided on a second side surface that is a surface of the electronic instrument and opposite to the first side surface; and
a data transfer control device that is connected to the upstream port and the downstream port and controls data transfer through the upstream port and data transfer through the downstream port,
the data transfer control device including:
a device controller that controls data transfer as a device; and
a host controller that controls data transfer as a host,
when a second electronic instrument has been connected to the downstream port, the host controller controlling data transfer between the electronic instrument and the second electronic instrument through the downstream port, and
when the second electronic instrument has been connected to the upstream port, the device controller controlling data transfer between the electronic instrument and the second electronic instrument through the upstream port.

2. The electronic instrument as defined in claim 1,
a position of the downstream port on the second side surface corresponding to a position of the upstream port on the first side surface.

3. The electronic instrument as defined in claim 1,
the downstream port and the upstream port being provided in line symmetry with respect to a center line between a line extending in a longitudinal direction along the first side surface and a line extending in the longitudinal direction along the second side surface.

4. The electronic instrument as defined in claim 1,
a connector having a first shape being provided to the upstream port, and a connector having a second shape that is capable of being coupled with the connector having the first shape being provided to the downstream port.

5. An electronic instrument, comprising:
an upstream port provided on a first side surface of the electronic instrument;
a downstream port provided on a second side surface of the electronic instrument differing from the first side surface; and
a data transfer control device that is connected to the upstream port and the downstream port and controls data transfer through the upstream port and data transfer through the downstream port,
a connector having a first shape being provided to the upstream port, and
a connector having a second shape that is capable of being coupled with the connector having the first shape being provided to the downstream port,
the data transfer control device including:
a device controller that controls data transfer as a device; and
a host controller that controls data transfer as a host,
when a second electronic instrument has been connected to the downstream port, the host controller controlling data transfer between the electronic instrument and the second electronic instrument through the downstream port, and
when the second electronic instrument has been connected to the upstream port, the device controller controlling data transfer between the electronic instrument and the second electronic instrument through the upstream port.

6. The electronic instrument as defined in claim 4,
one of the connectors having the first and second shapes being a female connector, and the other of the connectors having the first and second shapes being a male connector.

7. The electronic instrument as defined in claim 5,
one of the connectors having the first and second shapes being a female connector, and the other of the connectors having the first and second shapes being a male connector.

8. An electronic instrument, comprising:
an upstream port provided on a first side surface of the electronic instrument;
a downstream port provided on a second side surface that is a surface of the electronic instrument and opposite to the first side surface; and
a data transfer control device that is connected to the upstream port and the downstream port and controls data transfer through the upstream port and data transfer through the downstream port,
when a second electronic instrument has been connected to the downstream port, the data transfer control device performing processing of copying or moving data stored in a storage of the electronic instrument to a storage of the second electronic instrument through the downstream port, or processing of copying or moving data stored in a storage of the second electronic instrument to the storage of the electronic instrument through the downstream port.

9. An electronic instrument, comprising:
an upstream port provided on a first side surface of the electronic instrument;
a downstream port provided on a second side surface of the electronic instrument differing from the first side surface; and a data transfer control device that is connected to the upstream port and the downstream port and controls data transfer through the upstream port and data transfer through the downstream port,
a connector having a first shape being provided to the upstream port; and
a connector having a second shape that is capable of being coupled with the connector having the first shape being provided to the downstream port,
when a second electronic instrument has been connected to the downstream port, the data transfer control device performing processing of copying or moving data stored in a storage of the electronic instrument to a storage of the second electronic instrument through the downstream port, or processing of copying or moving data stored in a storage of the second electronic instrument to the storage of the electronic instrument through the downstream port.

10. The electronic instrument as defined in claim 8, comprising:
an operation section that allows a user to issue an operation instruction,
the data transfer control device performing the copy or movement processing based on the operation instruction from the operation section.

11. The electronic instrument as defined in claim 9, comprising:
an operation section that allows a user to issue an operation instruction,
the data transfer control device performing the copy or movement processing based on the operation instruction from the operation section.

12. An electronic instrument, comprising:
an upstream port provided on a first side surface of the electronic instrument;
a downstream port provided on a second side surface that is a surface of the electronic instrument and opposite to the first side surface; and
a data transfer control device that is connected to the upstream port and the downstream port and controls data transfer through the upstream port and data transfer through the downstream port,
when a second electronic instrument has been connected to the downstream port, the data transfer control device performing processing of transmitting data stored in a storage of the electronic instrument to a storage of the second electronic instrument through the downstream port, or processing of receiving data stored in the storage of the second electronic instrument from the second electronic instrument through the downstream port under control of a data transfer control device of the second electronic instrument.

13. An electronic instrument, comprising:
an upstream port provided on a first side surface of the electronic instrument;
a downstream port provided on a second side surface of the electronic instrument differing from the first side surface; and
a data transfer control device that is connected to the upstream port and the downstream port and controls data transfer through the upstream port and data transfer through the downstream port,
a connector having a first shape being provided to the upstream port, and
a connector having a second shape that is capable of being coupled with the connector having the first shape being provided to the downstream port, when a second electronic instrument has been connected to the downstream port, the data transfer control device performing processing of transmitting data stored in a storage of the electronic instrument to a storage of the second electronic instrument through the downstream port, or processing of receiving data stored in the storage of the second electronic instrument from the second electronic instrument through the downstream port under control of a data transfer control device of the second electronic instrument.

14. An electronic instrument, comprising:
an upstream port provided on a first side surface of the electronic instrument;
a downstream port provided on a second side surface that is a surface of the electronic instrument and opposite to the first side surface; and
a data transfer control device that is connected to the upstream port and the downstream port and controls data transfer through the upstream port and data transfer through the downstream port,
when a second electronic instrument has been connected to the upstream port, the data transfer control device performing processing of copying or moving data stored in a storage of the electronic instrument to a storage of the second electronic instrument through the upstream port, or processing of copying or moving data stored in a storage of the second electronic instrument to the storage of the electronic instrument through the upstream port.

15. An electronic instrument, comprising:
an upstream port provided on a first side surface of the electronic instrument;
a downstream port provided on a second side surface of the electronic instrument differing from the first side surface; and
a data transfer control device that is connected to the upstream port and the downstream port and controls data transfer through the upstream port and data transfer through the downstream port,
a connector having a first shape being provided to the upstream port, and
a connector having a second shape that is capable of being coupled with the connector having the first shape being provided to the downstream port,
when a second electronic instrument has been connected to the upstream port, the data transfer control device performing processing of copying or moving data stored in a storage of the electronic instrument to a storage of the second electronic instrument through the upstream port, or processing of copying or moving data stored in a storage of the second electronic instrument to the storage of the electronic instrument through the upstream port.

16. The electronic instrument as defined in claim 14, comprising:
an operation section that allows a user to issue an operation instruction,
the data transfer control device performing the copy or movement processing based on the operation instruction from the operation section.

17. The electronic instrument as defined in claim 15, comprising:
an operation section that allows a user to issue an operation instruction,
the data transfer control device performing the copy or movement processing based on the operation instruction from the operation section.

18. An electronic instrument, comprising:
an upstream port provided on a first side surface of the electronic instrument;
a downstream port provided on a second side surface that is a surface of the electronic instrument and opposite to the first side surface; and
a data transfer control device that is connected to the upstream port and the downstream port and controls data transfer through the upstream port and data transfer through the downstream port,
when a second electronic instrument has been connected to the upstream port, the data transfer control device performing processing of transmitting data stored in a storage of the electronic instrument to a storage of the second electronic instrument through the upstream port, or processing of receiving data stored in the storage of the second electronic instrument from the second electronic instrument through the upstream port under control of a data transfer control device of the second electronic instrument.

19. An electronic instrument, comprising:
an upstream port provided on a first side surface of the electronic instrument;
a downstream port provided on a second side surface of the electronic instrument differing from the first side surface; and
a data transfer control device that is connected to the upstream port and the downstream port and controls data transfer through the upstream port and data transfer through the downstream port,
a connector having a first shape being provided to the upstream port, and
a connector having a second shape that is capable of being coupled with the connector having the first shape being provided to the downstream port,
when a second electronic instrument has been connected to the upstream port, the data transfer control device performing processing of transmitting data stored in a storage of the electronic instrument to a storage of the second electronic instrument through the upstream port, or processing of receiving data stored in the storage of the second electronic instrument from the second electronic instrument through the upstream port under control of a data transfer control device of the second electronic instrument.

20. An electronic instrument, comprising:
an upstream port provided on a first side surface of the electronic instrument;
a downstream port provided on a second side surface that is a surface of the electronic instrument and opposite to the first side surface; and
a data transfer control device that is connected to the upstream port and the downstream port and controls data transfer through the upstream port and data transfer through the downstream port,
the data transfer control device including:
a transceiver connected to the upstream port and the downstream port;
a device controller that controls data transfer as a device;
a host controller that controls data transfer as a host; and
a first selector that performs switch control for connecting the transceiver to the device controller during upstream connection and connecting the transceiver to the host controller during downstream connection.

21. An electronic instrument, comprising:
an upstream port provided on a first side surface of the electronic instrument;

a downstream port provided on a second side surface of the electronic instrument differing from the first side surface; and a data transfer control device that is connected to the upstream port and the downstream port and controls data transfer through the upstream port and data transfer through the downstream port, a connector having a first shape being provided to the upstream port, and a connector having a second shape that is capable of being coupled with the connector having the first shape being provided to the downstream port, the data transfer control device including:

a transceiver connected to the upstream port and the downstream port;

a device controller that controls data transfer as a device;

a host controller that controls data transfer as a host; and a first selector that performs switch control for connecting the transceiver to the device controller during upstream connection and connecting the transceiver to the host controller during downstream connection.

22. The electronic instrument as defined in claim 20,
the data transfer control device including:
a data buffer that temporarily stores transfer data; and
a second selector that performs switch control for connecting the data buffer to the device controller during upstream connection and connecting the data buffer to the host controller during downstream connection.

23. The electronic instrument as defined in claim 21,
the data transfer control device including:
a data buffer that temporarily stores transfer data; and
a second selector that performs switch control for connecting the data buffer to the device controller during upstream connection and connecting the data buffer to the host controller during downstream connection.

24. An electronic instrument, comprising:

an upstream port provided on a first side surface of the electronic instrument;

a downstream port provided on a second side surface that is a surface of the electronic instrument and opposite to the first side surface; and a data transfer control device that is connected to the upstream port and the downstream port and controls data transfer through the upstream port and data transfer through the downstream port, a transceiver included in the data transfer control device including:

upstream differential signal lines connected to an upstream port;

downstream differential signal lines connected to a downstream port;

common differential signal lines used in common by the upstream port and the downstream port;

a first transmission driver for a first transfer mode, an output of the first transmission driver being connected to the upstream differential signal lines;

a second transmission driver for the first transfer mode, an output of the second transmission driver being connected to the downstream differential signal lines;

a first switch circuit that connects an input of the first transmission driver to an output of a logic circuit that outputs transmission data during upstream connection, and connects an input of the second transmission driver to the output of the logic circuit during downstream connection;

a second switch circuit that connects the upstream differential signal lines to the common differential signal lines during the upstream connection, and connects the downstream differential signal lines to the common differential signal lines during the downstream connection; and a third transmission driver for a second transfer mode that is lower in speed than the first transfer mode, an output of the third transmission driver being connected to the common differential signal lines.

25. An electronic instrument, comprising:

an upstream port provided on a first side surface of the electronic instrument;

a downstream port provided on a second side surface of the electronic instrument differing from the first side surface; and a data transfer control device that is connected to the upstream port and the downstream port and controls data transfer through the upstream port and data transfer through the downstream port, a connector having a first shape being provided to the upstream port, and a connector having a second shape that is capable of being coupled with the connector having the first shape being provided to the downstream port, a transceiver included in the data transfer control device including:

upstream differential signal lines connected to an upstream port;

downstream differential signal lines connected to a downstream port;

common differential signal lines used in common by the upstream port and the downstream port;

a first transmission driver for a first transfer mode, an output of the first transmission driver being connected to the upstream differential signal lines;

a second transmission driver for the first transfer mode, an output of the second transmission driver being connected to the downstream differential signal lines;

a first switch circuit that connects an input of the first transmission driver to an output of a logic circuit that outputs transmission data during upstream connection, and connects an input of the second transmission driver to the output of the logic circuit during downstream connection;

a second switch circuit that connects the upstream differential signal lines to the common differential signal lines during the upstream connection, and connects the downstream differential signal lines to the common differential signal lines during the downstream connection; and a third transmission driver for a second transfer mode that is lower in speed than the first transfer mode, an output of the third transmission driver being connected to the common differential signal lines.

26. An electronic instrument, comprising:

an upstream port provided on a first side surface of the electronic instrument;

a downstream port provided on a second side surface that is a surface of the electronic instrument and opposite to the first side surface; and a data transfer control device that is connected to the upstream port and the downstream port and controls data transfer through the upstream port and data transfer through the downstream port, a transceiver included in the data transfer control device including:

upstream differential signal lines connected to an upstream port;

downstream differential signal lines connected to a downstream port;

common differential signal lines used in common by the upstream port and the downstream port;

a first transmission driver for a first transfer mode, an output of the first transmission driver being connected to the upstream differential signal lines;

a second transmission driver for the first transfer mode, an output of the second transmission driver being connected to the downstream differential signal lines;

a first switch circuit that connects an input of the first transmission driver to an output of a logic circuit that outputs transmission data during upstream connection, and connects an input of the second transmission driver to the output of the logic circuit during downstream connection;

a second switch circuit that connects the upstream differential signal lines to the common differential signal lines during the upstream connection, and connects the downstream differential signal lines to the common differential signal lines during the downstream connection;

a differential receiver for the first transfer mode, an input of the differential receiver being connected to the common differential signal lines; and a detection circuit that detects whether differential signal data is valid or invalid, an input of the detection circuit being connected to the common differential signal lines.

27. An electronic instrument, comprising:

an upstream port provided on a first side surface of the electronic instrument;

a downstream port provided on a second side surface of the electronic instrument differing from the first side surface; and a data transfer control device that is connected to the upstream port and the downstream port and controls data transfer through the upstream port and data transfer through the downstream port, a connector having a first shape being provided to the upstream port, and a connector having a second shape that is capable of being coupled with the connector having the first shape being provided to the downstream port, a transceiver included in the data transfer control device including:

an upstream differential signal lines connected to an upstream port;

a downstream differential signal lines connected to a downstream port;

a common differential signal lines used in common by the upstream port and the downstream port;

a first transmission driver for a first transfer mode, an output of the first transmission driver being connected to the upstream differential signal lines;

a second transmission driver for the first transfer mode, an output of the second transmission driver being connected to the downstream differential signal lines;

a first switch circuit that connects an input of the first transmission driver to an output of a logic circuit that outputs transmission data during upstream connection, and connects an input of the second transmission driver to the output of the logic circuit during downstream connection;

a second switch circuit that connects the upstream differential signal lines to the common differential signal lines during the upstream connection, and connects the downstream differential signal lines to the common differential signal lines during the downstream connection;

a differential receiver for the first transfer mode, an input of the differential receiver being connected to the common differential signal lines; and a detection circuit that detects whether differential signal data is valid or invalid, an input of the detection circuit being connected to the common differential signal lines.

* * * * *